US007236334B2

(12) United States Patent
Ding et al.

(10) Patent No.: US 7,236,334 B2
(45) Date of Patent: Jun. 26, 2007

(54) REPEATABLE ESD PROTECTION UTILIZING A PROCESS FOR UNSHORTING A FIRST SHORTING MATERIAL BETWEEN ELECTRICAL PADS AND RESHORTING BY RECREATING THE SHORT

(75) Inventors: Meng Ding, Mountain View, CA (US); Surya Narayan Pattanaik, San Jose, CA (US); Chie Ching Poon, San Jose, CA (US); Neil Leslie Robertson, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 413 days.

(21) Appl. No.: 10/931,731

(22) Filed: Aug. 31, 2004

(65) Prior Publication Data

US 2006/0044702 A1   Mar. 2, 2006

(51) Int. Cl.
    *G11B 5/39* (2006.01)
(52) U.S. Cl. .................................. 360/323
(58) Field of Classification Search ............. 360/323
    See application file for complete search history.

(56) References Cited

U.S. PATENT DOCUMENTS

| 4,494,104 | A  |   | 1/1985  | Holmes ..................... 337/403 |
| 5,644,454 | A  |   | 7/1997  | Arya et al. ................. 360/106 |
| 5,650,958 | A  |   | 7/1997  | Gallagher et al. .......... 365/173 |
| 5,748,412 | A  |   | 5/1998  | Murdock et al. ........... 360/113 |
| 5,757,590 | A  |   | 5/1998  | Phipps et al. ............... 360/113 |
| 5,759,428 | A  |   | 6/1998  | Balamane et al. ....... 219/121.66 |
| 6,049,056 | A  |   | 4/2000  | Balamane et al. ....... 219/121.66 |
| 6,146,813 | A  | * | 11/2000 | Girard et al. ............... 430/319 |
| 6,177,151 | B1 |   | 1/2001  | Chrisey et al. ............. 427/596 |
| 6,239,685 | B1 | * | 5/2001  | Albrecht et al. ........... 337/365 |
| 6,400,534 | B1 |   | 6/2002  | Klaassen ................... 360/323 |
| 6,538,857 | B1 | * | 3/2003  | Doss et al. ................. 360/323 |
| 2003/0178395 | A1 |   | 9/2003 | Duignan ................ 219/121.68 |
| 2004/0021499 | A1 |   | 2/2004 | Iwamoto et al. ............ 327/525 |

OTHER PUBLICATIONS

S.M. Pimenov, G.A. Shafeev, A.A. Smolin, V.I. Konov, B.K. Voldolaga, "Laser-Induced Forward Transfer of Ultra-fine Diamond Particles For Selective Deposition of Diamond Films," 1995, Applied Surface Science 86 (1995) 208-212.
A. Pique, D.B. Chrisey, R.C.Y. Auyeung, J. Fitz-Gerald, H.D. Wu, R.A. MCGill, S. Lakeou, P.K. Wu, V. Nguyen, M. Duignan, "A Novel Laser Transfer Process For Direct Writing of Electronic and Sensor Materials," 1999, Applied Physics A 69 (Suppl.), Materials Science & Processing.

(Continued)

*Primary Examiner*—A. J. Heinz
(74) *Attorney, Agent, or Firm*—Zilka-Kotab, PC

(57) ABSTRACT

A method for shorting, unshorting, and reshorting an electronic component such as an MR sensor provides a repeatable ESD protection scheme. A conductive line of an electrically conductive first shorting material is created between electrical leads operatively coupled to an electronic component for creating a short therebetween. The short is severed using a laser. The short is recreated by applying a second shorting material, which may or may not be the same as the first shorting material.

34 Claims, 17 Drawing Sheets

OTHER PUBLICATIONS

H. Yamada, T. Sano, T. Nakayama, I. Miyamoto, "Optimization of Laser-Induced forward Transfer Process of Metal Thin Films," 2002, Applied Surface Science, 197-198 (2002) 411-415.

I. Zergioti, S. Mailis, N.A. Vainos, C. Fotakis, S. Chen, C.P. Grigoropoulos, "Microdepostion of Metals by Femtosecond Excimer Laser," 1998, Applied Surface Science 127-129 (1998) 601-605.

J. Bohandy, B.F. Kim, F.J. Adrian, "Metal Deposition From a Supported Metal Film Using an Excimer Laser," 1986, J. Appl. Phys. 60 (4), Aug. 15, 1986.

E. Fogarassy, C. Fuchs, F Kerherve, G. Hauchecorne, J. Perriere, Laser-Induced Forward Transfer: A New Approach for the Deposition of High Tc Superconducting Thin Films, 1989, J. Mater. Res., vol. 4, No. 5, Sep./Oct. 1989.

C.C. Poon and A.C. Tam, "High-Resolution Deposited Patterns Using Laser-Induced Forward Transfer of Thin Films in an Ambient Gas of 1 ATM Pressure," Unpublished Paper, part of content presented at the CLEO-QELS Conference, Anaheim, CA, Jun. 2-7, 1996.

* cited by examiner

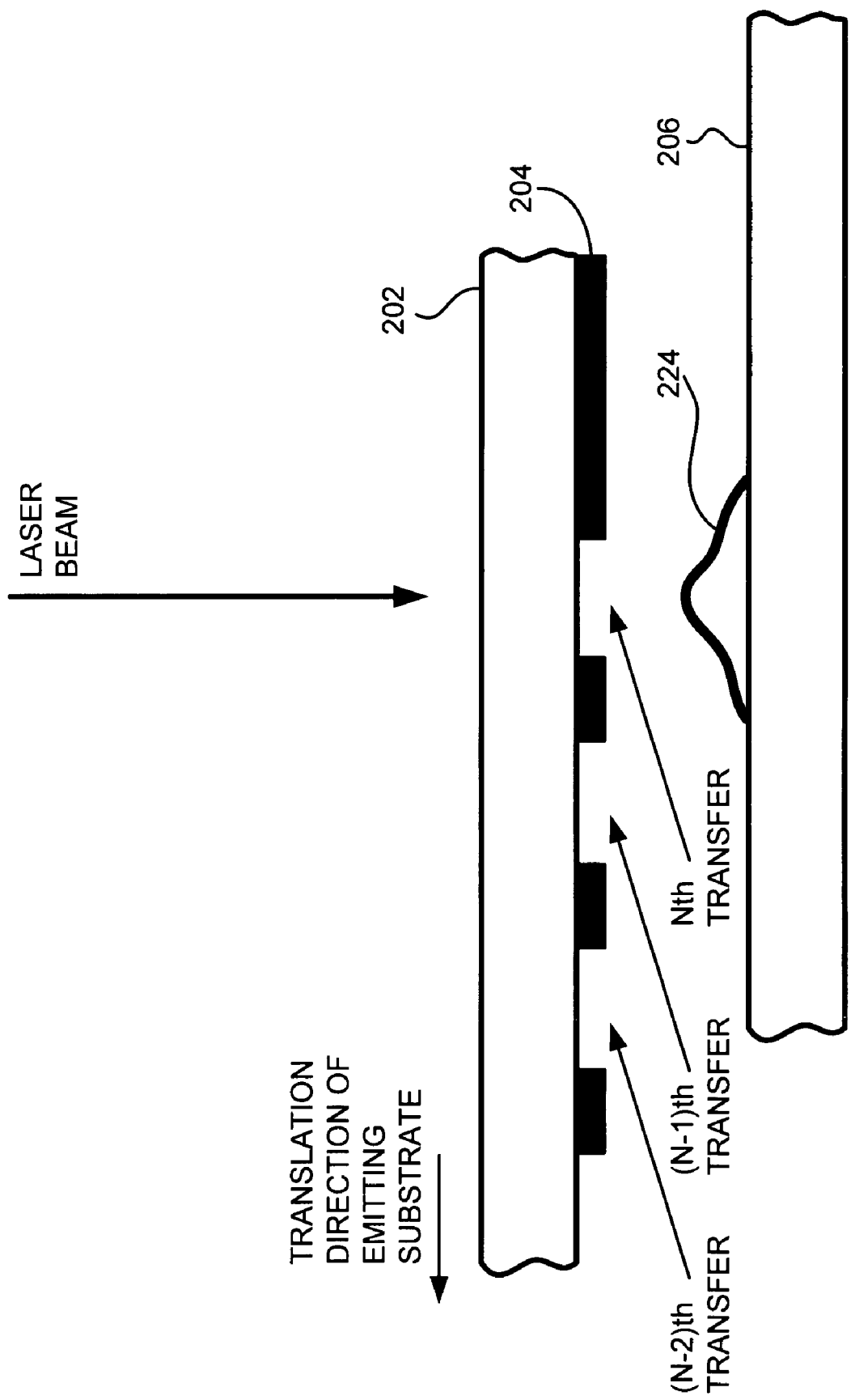

THICKNESS PROFILE OF THE
BAR-CODED CHARACTER *

REPEATABLE ESD PROTECTION UTILIZING A PROCESS FOR UNSHORTING A FIRST SHORTING MATERIAL BETWEEN ELECTRICAL PADS AND RESHORTING BY RECREATING THE SHORT

FIELD OF THE INVENTION

The present invention relates to a system and method for electrostatic discharge (ESD) protection of electronic components, and more particularly, this invention relates to repeatable creation and severing of a short to protect an electronic component from ESD damage.

BACKGROUND OF THE INVENTION

Magnetic head-based systems have been widely accepted in the computer industry as a cost-effective form of data storage. In a magnetic disk drive system, a magnetic recording medium in the form of a disk rotates at high speed while a magnetic head "flies" slightly above the surface of the rotating disk. The magnetic disk is rotated by means of a spindle drive motor. The magnetic head is attached to or formed integrally with a "slider" which is suspended over the disk by a suspension assembly which in turn is attached to an actuator arm. As the magnetic disk rotates at operating speed, the moving air generated by the rotating disk in conjunction with the physical design of the slider lifts the magnetic head, allowing it to glide or "fly" slightly above and over the disk surface on a cushion of air, referred to as an air bearing. The flying height of the magnetic head over the disk surface is typically only a few tens of nanometers or less and is primarily a function of disk rotation, the aerodynamic properties of the slider assembly and the force exerted by the spring-loaded actuator arm.

Magnetoresistive (MR) sensors are particularly useful as read elements in magnetic heads, used in the data storage industry for high data recording densities. Two examples of MR materials used in the storage industry are anisotropic magnetoresistive (AMR) and giant magnetoresistive (GMR). MR and GMR sensors are deposited as small and thin multi-layered sheet resistors on a structural substrate. The sheet resistors can be coupled to external devices by contact to metal pads which are electrically connected to the sheet resistors. MR sensors provide a high output signal which is not directly related to the head velocity as in the case of inductive read heads.

Another type of magnetic device currently under development is a magnetic tunnel junction (MTJ) device. The MTJ device has potential applications as a memory cell and as a magnetic field sensor. The MTJ device comprises two ferromagnetic layers separated by a thin, electrically insulating, tunnel barrier layer. The tunnel barrier layer is sufficiently thin that quantum-mechanical tunneling of charge carriers occurs between the ferromagnetic layers. The tunneling process is electron spin dependent, which means that the tunneling current across the junction depends on the spin-dependent electronic properties of the ferromagnetic materials and is a function of the relative orientation of the magnetizations of the two ferromagnetic layers. In the MTJ sensor, one ferromagnetic layer has its magnetization fixed, or pinned, and the other ferromagnetic layer has its magnetization free to rotate in response to an external magnetic field from the recording medium (the signal field). When an electric potential is applied between the two ferromagnetic layers, the sensor resistance is a function of the tunneling current across the insulating layer between the ferromagnetic layers. Since the tunneling current that flows perpendicularly through the tunnel barrier layer depends on the relative magnetization directions of the two ferromagnetic layers, recorded data can be read from a magnetic medium because the signal field causes a change of direction of magnetization of the free layer, which in turn causes a change in resistance of the MTJ sensor and a corresponding change in the sensed current or voltage. U.S. Pat. No. 5,650,958 granted to Gallagher et al., incorporated in its entirety herein by reference, discloses an MTJ sensor operating on the basis of the magnetic tunnel junction effect.

To achieve the high areal densities required by the data storage industry, the sensors are made with commensurately small dimensions. The smaller the dimensions, the more sensitive the thin sheet resistors become to damage from spurious current or voltage spike.

A major problem that is encountered during manufacturing, handling and use of MR sheet resistors as magnetic sensors is the buildup of electrostatic charges on the various elements of a head or other objects which come into contact with the sensors, particularly sensors of the thin film type, and the accompanying spurious discharge of the static electricity thus generated. Static charges may be externally produced and accumulate on instruments used by persons performing head manufacturing or testing function. These static charges may be discharged through the head causing excessive heating of the sensitive sensors which result in physical or magnetic damage to the sensors. This phenomenon is generally known as electrostatic discharge. A discharge of only a few volts can destroy or severely damage the MR sensor. Such a discharge can occur by contact with or close proximity to a person, plastic involved in the fabrication, or components of a magnetic medium drive.

As described above, when an MR head is exposed to voltage or current inputs which are larger than that intended under normal operating conditions, the sensor and other parts of the head may be damaged. This sensitivity to electrical damage is particularly severe for MR read sensors because of their relatively small physical size. For example, an MR sensor used for high recording densities for a magnetic disk drive (on the order of 100 Gbytes/in$^2$ or greater) is patterned as resistive sheets of MR and accompanying materials, and has a combined thickness for the sensor sheets on the order of 400 Angstroms (Å) with a width and height both on the order of 100 nm with the length and thickness of the MR sensor exposed at the air bearing surface of the MR head, while the height is buried in the body of the head. Discharge currents of tens of milliamps through such a small resistor can cause severe damage or complete destruction of the MR sensor. The nature of the damage which may be experienced by an MR sensor varies significantly, including complete destruction of the sensor via melting and evaporation, oxidation of materials at the air bearing surface (ABS), generation of shorts via electrical breakdown, and milder forms of magnetic or physical damage in which the head performance may be degraded. Short time current or voltage pulses which cause extensive physical damage to a sensor are termed electrostatic discharge (ESD) pulses. Short time pulses which do not result in noticeable physical damage (resistance changes), but which alter the magnetic response or stability of the sensors due to excessive heating are termed electrical overstress (EOS) pulses.

Several methods for reduction of ESD damage are detailed in U.S. Pat. No. 6,400,534 (resistive shunt), U.S. Pat. No. 5,757,590 (fusible links), U.S. Pat. No. 5,759,428 (laser cutting of a metal short), U.S. Pat. No. 5,748,412

(shunting with anti parallel diode pair), U.S. Pat. No. 5,644,454 (short on the suspension), etc. While each of these methods can provide certain ESD protection, factors such as cost, effectiveness in terms of variations in ESD transients, extent of protection in slider fabrication, added complexity to manufacturing, etc. have precluded their eventual implementation.

In the diode approach, for example, a pair of diodes is connected in parallel across the MR sensor, each diode pointing the opposite forward bias direction, (crossed diodes) to protect the MR device. The diode pair is intended to remain in parallel with the MR sensor during normal operation of the disk drive. Such an ESD protection scheme can lead to considerations in cost, space on the HGA, and performance issues with the MR sensor.

Electrically shorting out the MR sensor, by shorting the two ends of the sensor which connect to external devices, provides the best possible ESD protection. For example, an MR sensor is typically positioned between a pair of thin film gap layers which are in turn sandwiched between a pair of thin film shield layers. A pair of thin film leads, which are employed for transmitting the sense current through the MR sensor, also lie between the gap layers. The leads terminate at a pair of pads which are exposed for connection to drive electronics. A convenient way of protecting the MR sensor from ESD is to interconnect the pads with a thin film conductive line on the exterior surface of the MR head. This shorts the MR circuit, bypassing potential damaging current from electrical discharge. One of the best times to form the conductive line between the pads during assembly of a magnetic disk drive is at the row level which will be explained hereinafter. The problem with this technique is that the head is no longer functional while the short is applied. The short needs to be removed for testing purposes several times during the manufacturing and assembly of a magnetic hard disk drive; at row level, slider level, head-gimbal assembly (HGA) level and at head-stack assembly (HSA) level. Once the short is removed, for testing or use, the sensors are no longer protected.

Thus, in all of the known methods for providing ESD protection, one common drawback remains. None of these methods can provide the flexibility and effectiveness in ESD protection for the magnetic sensor as often as desired.

A need therefore exists for providing ESD protection that can be applied in a repeatable manner so that the head can be shorted when necessary, and the short severed when desired, such as for testing.

SUMMARY OF THE INVENTION

To overcome the aforementioned shortcomings in the prior art, the present invention according to one embodiment provides a non-invasive method for shorting, unshorting, and reshorting an electronic component such as an MR or magnetic tunnel junction sensor, thereby providing repeatable ESD protection. According to the method a shorting device, consisting of two electrical leads, which are extended to the leads or pads that connect to the electronic component requiring ESD protection, and a conductive line are provided such that the conductive line is electrically in parallel to the electronic component. The electrical conductivity of the shorting device (electrical leads and conductive line combined) is in general higher than that of the electronic component to effect ESD protection. The conductive line of an electrically conductive first shorting material is created between and straddles the electrical leads operatively coupled to an electronic component for creating a short therebetween. The electrical leads can also be the connecting pads for the electronic component. The short is severed using a laser. The short is recreated by applying a second shorting material, which may or may not be the same as the first shorting material.

The conductive line can be created between the lead wires or pads. The conductive line can also be created between secondary pads operatively coupled to the electronic component.

Preferred first or second shorting materials are metallic solder materials. The first or second shorting material is preferably a Tin-containing material. Other suitable materials include Chromium, Gold alloys, NiFe, Tin based solder alloys containing one or more of elements like Lead, Indium, Bismuth, Antimony, Silver, Copper, etc., and other metals or alloys with low (or high) melting point and high conductivity, etc. Preferably, the first or second shorting material is a material that would otherwise be present on the electronic component in an as-sold condition to avoid compatibility problems. The first or second shorting material preferably, but not necessarily, has a melting point lower than the leads to which it is coupled. Ideally, the first or second shorting material dewets upon laser or thermal severing of the short.

To avoid damage to underlying portions of the device being protected, the short created by the first or second shorting material can be severed over the lead, or can be severed over a nonfunctional pad.

In one embodiment, the second shorting material is created using a laser deposition process, such as pulsed laser deposition, laser chemical vapor deposition, or laser-induced forward transfer (LIFT). Multiple layers of the second shorting material can be applied to create the desired electrical conductivity.

Preferably, the short created by the second shorting material has an electrical resistance lower than the electronic component so that most of the ESD current passes through the short rather than the electronic component.

In an embodiment, the second shorting material is formed at a location different than the location of the first shorting material but remains electrically in parallel to the electronic component.

The short created by the second shorting material can be severed for testing, and the second shorting material reapplied for recreating a short a third time. In this way, ESD protection can be provided during many or all stages of processing.

A device that has undergone the method above includes an electronic component such as an MR sensor, a pair of leads operatively coupled to the electronic component, and shorting material between the leads, the shorting material having been applied by a laser deposition process, the shorting material having been severed.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 18 is a partial system diagram of a LIFT process depicting translation of the emitting substrate.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

The present invention provides techniques to protect an electronic component in a repeatable fashion, as needed, during the sequence of post wafer processing. While the present invention is adapted for use with any type of electronic component, much of the remaining discussion will be described in relation to MR sensor fabrication and place the invention in context as well as to aid the reader in understanding the teachings provided herein. Note also that the following description would also apply to tunnel junction devices as well.

Figure 1:
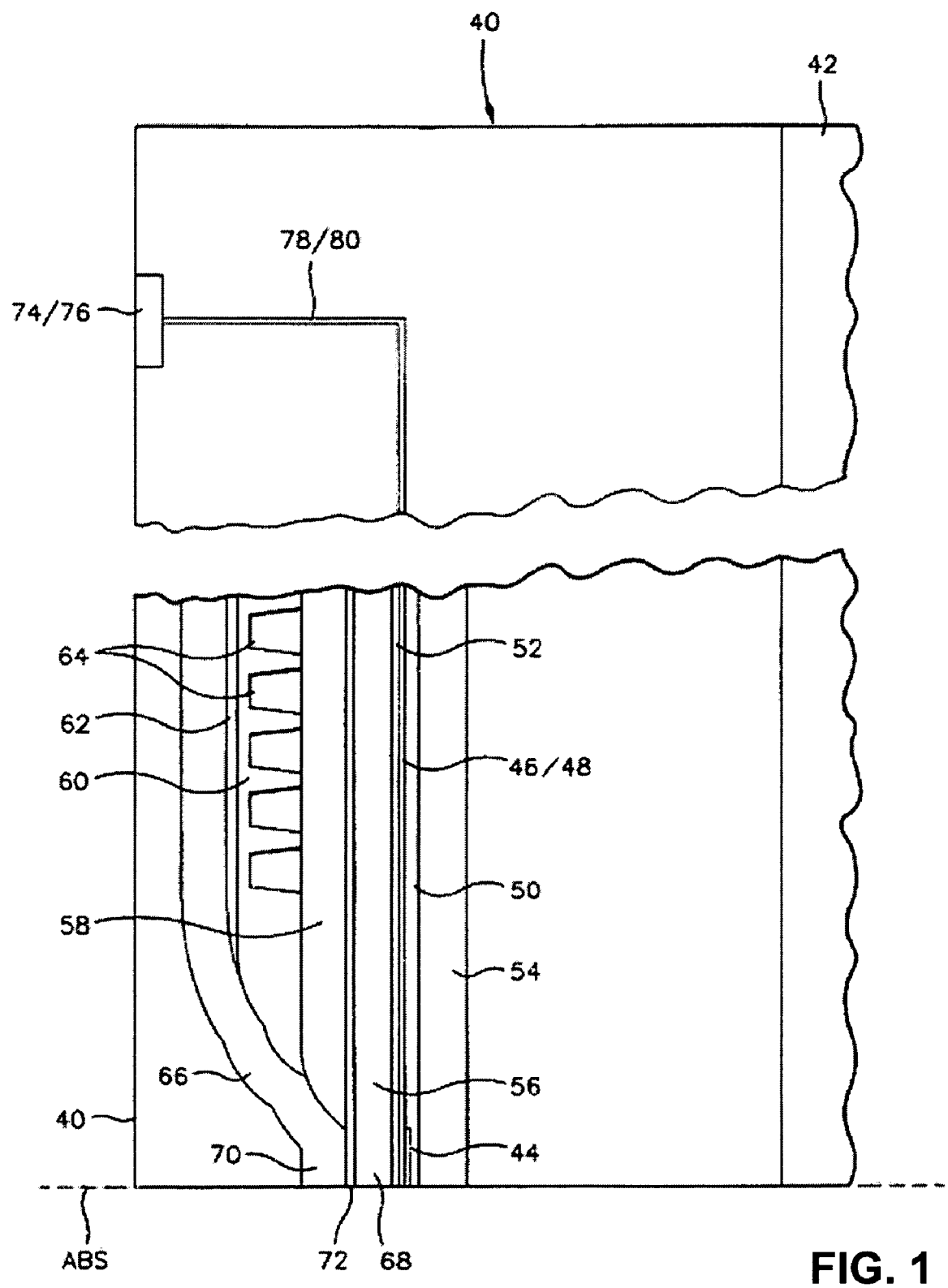
FIG. 1 is a cross-sectional view of a merged MR head mounted on a slider.

Referring now to the drawings wherein like reference numerals designate like or similar parts throughout the several views there is illustrated in FIG. 1 a magnetic head 40 which is mounted on a slider 42. The magnetic head has a read head portion and a write head portion. The read head portion includes a magnetoresistive (MR) sensor 44 and accompanying leads 46/48 which are sandwiched between first and second gap layers 50 and 52 which are, in turn, sandwiched between first and second shield layers 54 and 56. The write head portion of the magnetic head includes an insulation stack of layers 58, 60 and 62 with a coil layer 64 embedded therein sandwiched between first and second pole pieces 56 and 66. In this embodiment the second shield layer of the read head and the first pole piece of the write head are the same layer 56. This type of head is referred to as a merged MR head. When the second shield layer and the first pole piece are separate layers the magnetic head is referred to as a piggyback MR head. Either type of head is applicable to the present invention. The first and second pole pieces 56 and 66 terminate in first and second pole pieces 68 and 70 which are separated by a gap layer 72. During recording flux induced in the first and second pole pieces 56 and 66 by the coil layer 64 is conducted to the pole tips, where the flux fringes across the gap layer 72 to magnetically record signals on a rotating magnetic disk. During playback changing magnetic fields on the rotating disk cause a proportional resistance change in the MR sensor 44. A sense current, which is conducted through the MR sensor 44 via the first and second leads 46 and 48, varies proportionately to the change in resistance of the MR sensor 44, thereby allowing detection of the playback signal.

The first and second leads 46/48 from the MR sensor are connected to exterior pads 74/76 by vias 78/80. There are two leads, two vias and two pads which will be shown in plan views in subsequent figures. The aforementioned sense current is inducted to the MR sensor 44 by processing circuitry which is connected to the pads 74/76 shown in FIG. 2. The MR sensor 44 includes an MR stripe. Typical dimensions of the MR stripe are 100 nm wide, 100 nm high and 400 Å thick. During construction and assembly of a magnetic disk drive the MR stripe is very vulnerable to electrostatic discharge (ESD) across the pads 74/76. This can be caused by contact with a person or other components involved in the assembly of the disk drive. It is important to protect the MR sensor 44 from ESD as early as practical. This can be accomplished by shorting the MR circuit with a conductive line across the pads 74/76 that can be easily removed at a subsequent stage in the manufacturing process. The following discussion addresses the manufacturing of the magnetic disk drive, commencing with fabrication of the magnetic heads and sliders, and particularly emphasizes fabricating a conductive line across the MR pads, severing the short created by the conductive line during the manufacturing process to render the MR sensor operational for testing and use, and recreating the short when desired.

Figure 2:
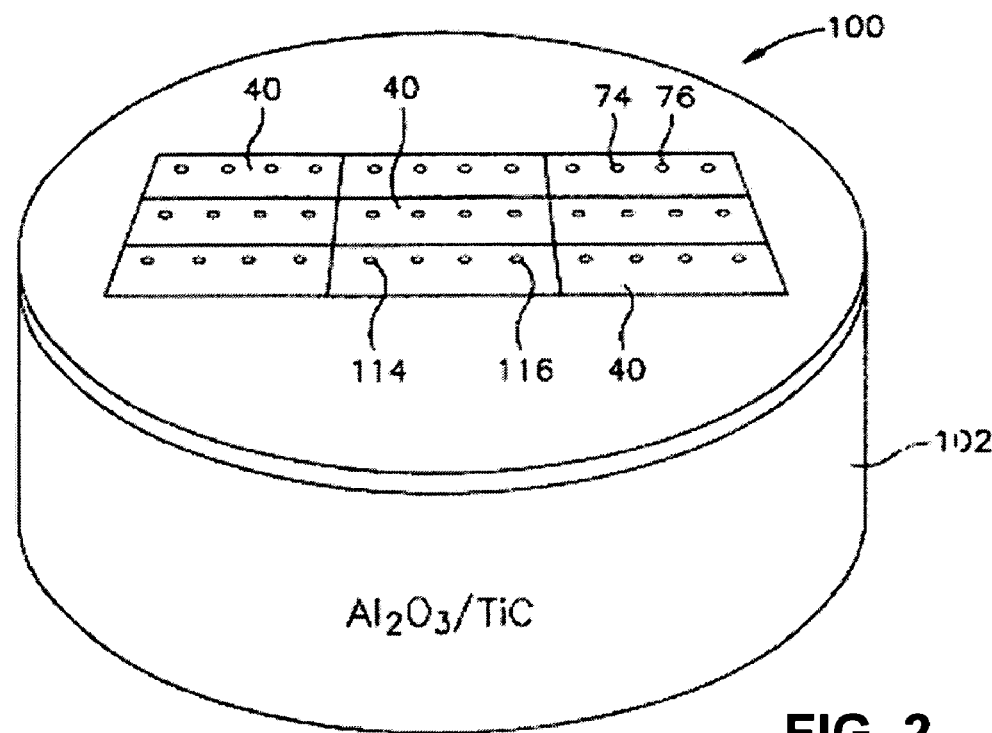
FIG. 2 is an isometric view of rows and columns of magnetic heads formed on a wafer.
Figure 3:
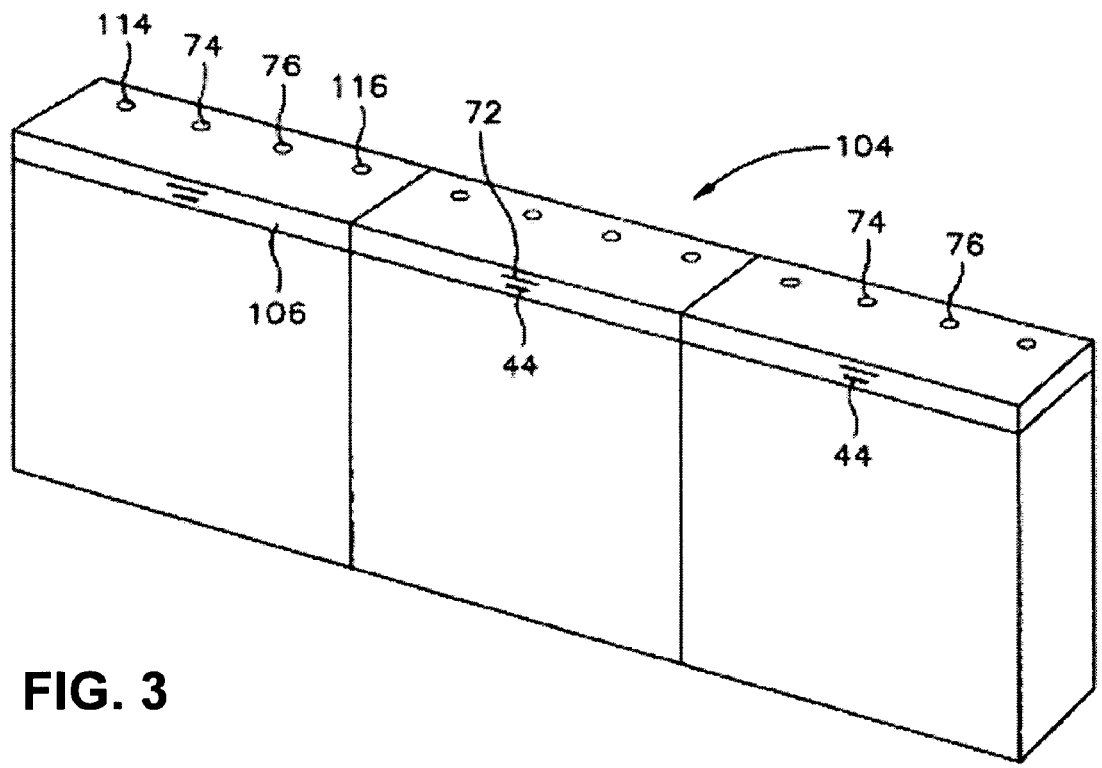
FIG. 3 is an isometric view of a row of magnetic heads cut from the wafer shown in FIG. 1.

In FIG. 2 a plurality of magnetic heads 40 are shown fabricated in rows and columns at the wafer level 100 on a wafer 102 which will provide a slider for each head after cutting. A typical slider material is alumina/titanium carbide (Al$_2$O$_3$/TiC). The magnetic heads are fabricated by forming a plurality of thin film layers which are shown in FIG. 1. The thin film layers are formed by plating, sputtering and various masking techniques which are well known in the art. After formation of the required thin film layers the rows and columns of magnetic heads are diced into rows, one row of magnetic heads being illustrated at 104 in FIG. 3. This stage of the process is referred to as the row level. At the row level the row 104 of magnetic heads may be lapped (not shown) across the pole tips for forming desired zero throat heights for the first and second pole tips 68 and 70 of each head as seen in FIG. 1.

Figure 4A:
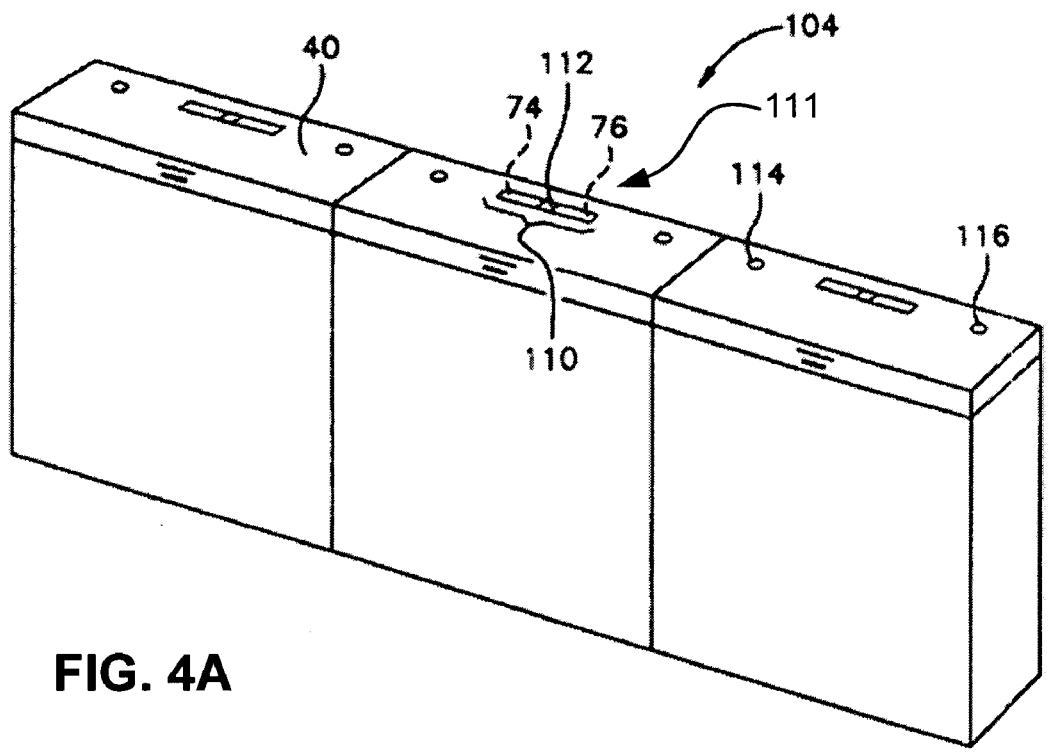
FIG. 4A is the same as FIG. 3 except thin film conductive lines have been formed between pairs of pads to MR sensors.

In FIG. 4A the shorting device 111 consists of the two electrical leads, the ends of which are not connected. Each of these two leads is connected to the MR pads 74 and 76, which in turn are connected to the MR head 40. The conductive line 112 is created to short the ends of these two leads. As a result the shorting device 111 and the MR 40 are electrically in parallel. The material for the conductive line 112 can be any suitable material of high electrical conductivity and should be acceptable in the disk drive environment (or whichever environment the electronic component is ultimately used in). One suitable shorting material in the case of an MR head is a metallic solder used for solderball bonding at the head-gimbal assembly (HGA) level. Another suitable shorting material is a metal having a lower melting point than the metal leads to which coupled (particularly useful for laser and thermal unshorting). Yet another suitable shorting material is a metal having a higher melting point than the metal leads to which coupled (particularly useful for laser unshorting).

Preferred shorting materials are those that are already deposited on the device and/or which are otherwise present on the device in its as-sold (e.g., final) condition. This reduces problems with material compatibility, contamination, etc. For instance, a shorting material compatible with the solder being used in the HGA can be selected. A Tin-containing shorting material is preferred, because Tin is typically used to bond wires to the pad and so is already present on the device. Gold is a preferred material for forming contacts and leads due to its high electrical conductivity and corrosion resistance. If Tin is melted on a gold surface, it has a low contact angle and so tends to spread and adhere to gold very well. Further, most Tin alloys have a very low melting point (e.g., 180–300° C.). Gold melts at about 1064° C. Thus, a low power laser can be used. For instance, a low cost laser, such as a laser of the type typically used in consumer optical storage devices can be used.

Materials other than tin can also be used. Other suitable materials include Chromium, Gold alloys, NiFe, Tin based solder alloys containing one or more of elements like Lead, Indium, Bismuth, Antimony, Silver, Copper, etc., and other metals or alloys with low (or high) melting point and high conductivity, etc.

The conductive line 112 between the pads 74 and 76 is typically 20–300 μm long, 2–60 μm wide and 0.1–5 μm thick. We have found that the best time to form the first conductive lines 112 is at the wafer level shown in FIG. 2, however, it should be understood that these lines could be formed at the row level shown in FIG. 4A.

At the wafer level, the conductive lines 112 can be sputtered onto the devices and over the lead 110 for the MR pads using a photoresist mask so only certain parts of the head, e.g., MR sensor leads, are shorted. After liftoff to remove the photoresist, all of the MR sensors are shorted. Then the wafer is sent through slider fabrication. Typically for sliders, where thousands of heads are formed per wafer, sputtering provides the most cost effective mechanism for adding the shorting material. Note however, that the shorting material can also be applied by plating, evaporation, etc. Also note that this method can be adapted to provide ESD protection regardless of the method of manufacturing the electronic components. For instance, magnetic disk drive heads can be fabricated and shorted in rows or individually.

Figure 4B:
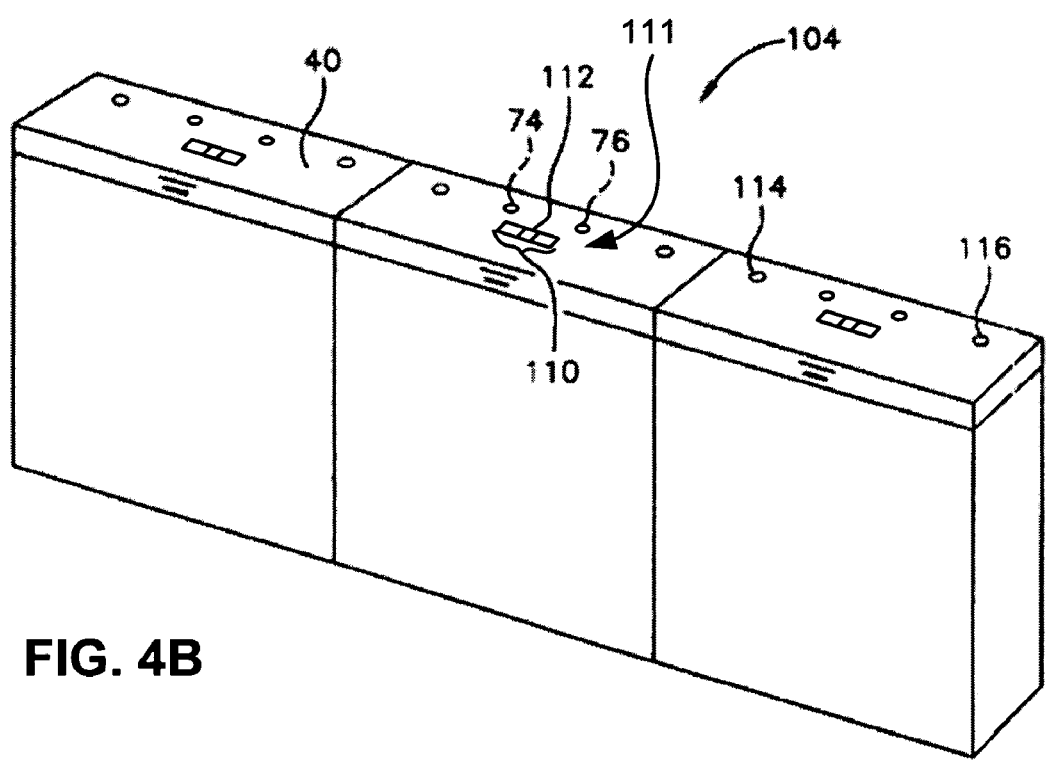
FIG. 4B is the same as FIG. 3 except thin film conductive lines have been formed between supplemental pads having a shorter pitch than the main pads.

It may be desirable to reduce the spacing between the leads to be shorted, in case the spacing between the main leads is too large or inaccessible, or to reduce the resistance along the short. To accomplish this, one alternative is to create second set of shorting pads having an optimum spacing therebetween. FIG. 4B illustrates a variation where the conductive line 112 is formed between a second set of pads 110 having an optimized spacing between their ends than the main pads 74/76. In another variation, the conductive line 112 is applied between the lead paths themselves, not the pads.

Figure 5:
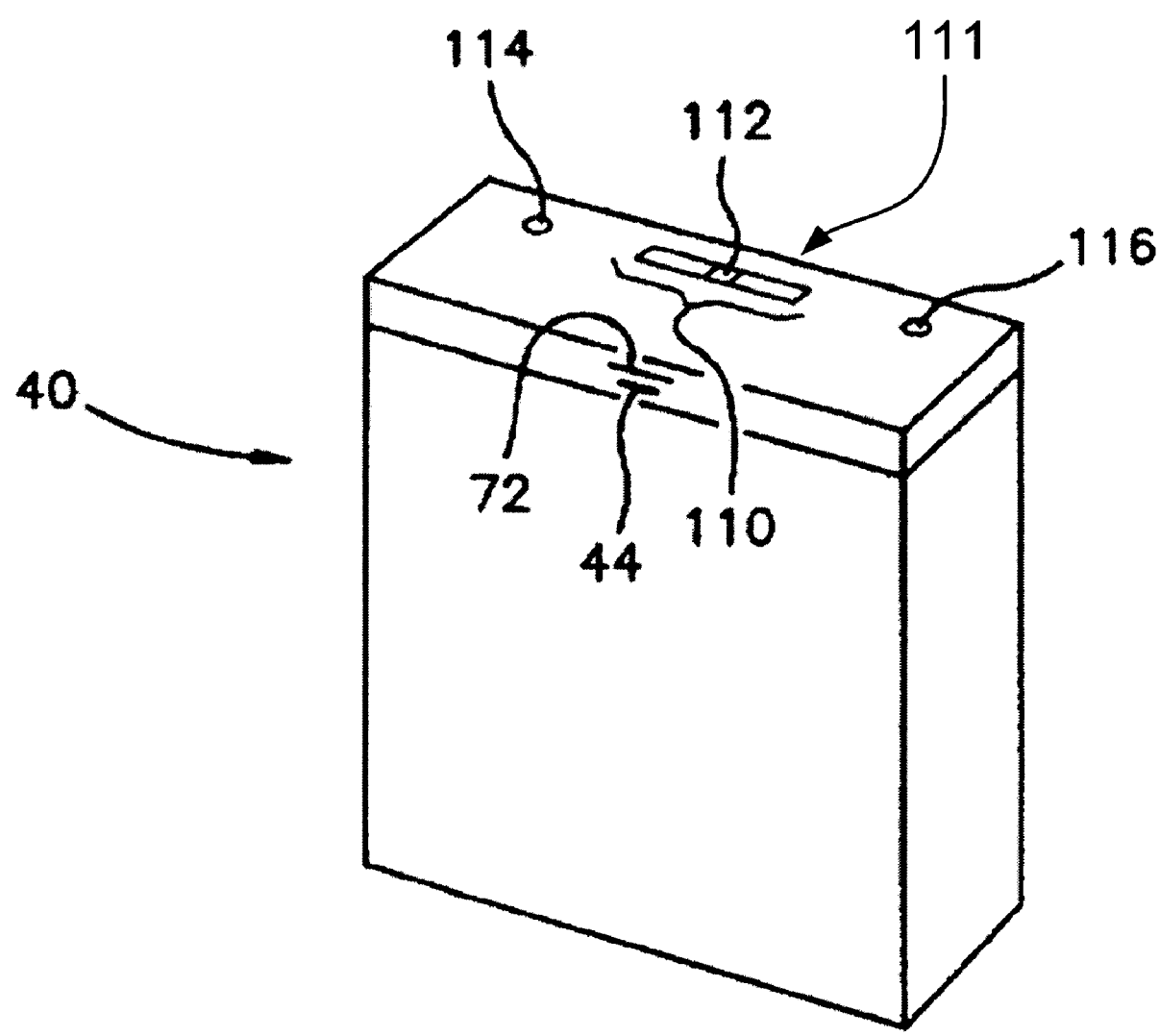
FIG. 5 is an isometric view of an MR head after being cut from the row of FIG. 4A.

The row of magnetic heads 104 is then diced into individual magnetic heads, one of these magnetic heads 40 being illustrated in FIG. 5. It should be understood that in actual practice a significantly greater number of rows and columns than that illustrated in FIG. 2 would be constructed at the wafer level. The two outside pads 114 and 116 are connected to the coil layer 64, shown in FIG. 1, for inducing write signals into the write head portion of the magnetic head. The components of the write head portion are large and do not typically need protection from ESD. In other cases, the MR sensor may be connected to the two pads at the same side of the MR head, and not to the two inside pads. Still in other cases, there may be more connecting pads on an MR head, other than pads 74, 76 for the MR sensor and pads 114, 116 for the coil layer. But their effect does not change the applicability of this invention.

Figure 6:
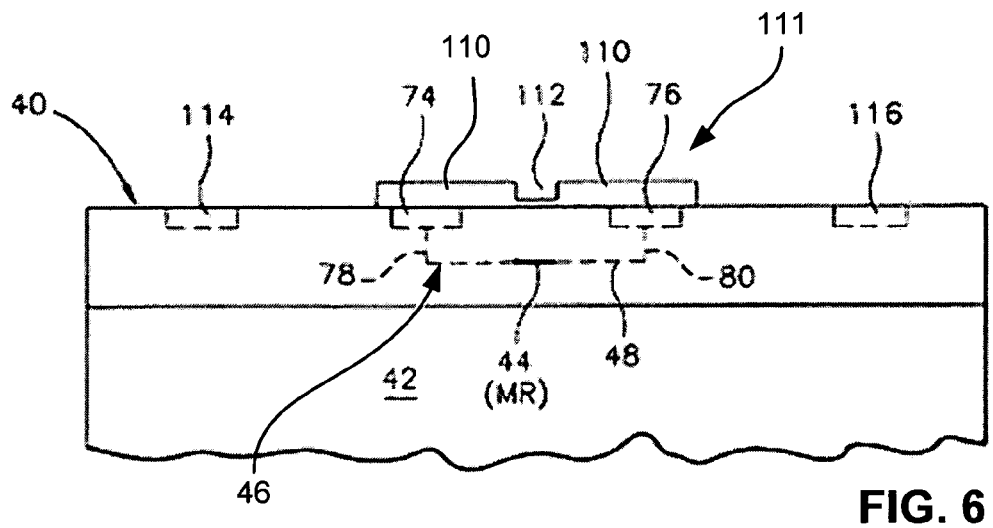
FIG. 6 is an enlarged schematic plan illustration of the slider mounted merged MR sensor with the pair of pads to the MR sensor being interconnected by a thin film conductive line, the majority of the slider being broken away.
Figure 7:
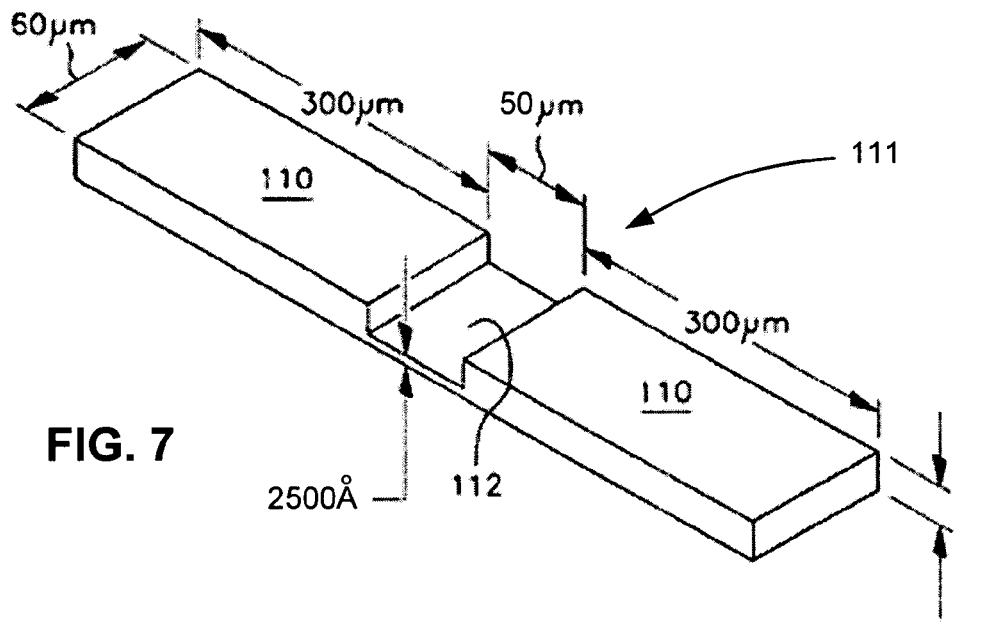
FIG. 7 is an enlarged isometric illustration of just the thin film conductive line.

FIG. 6 shows a schematic illustration of the magnetic head 40 and a portion of the slider 42 with representative dimensions. The shorting device 111 consists of the conductive line 112 with its leads 110 can be seen connecting the MR pads 74 and 76, the pads 74 and 76 being connected to the MR sensor 44 by the vias 78 and 80 and first and second leads 46 and 48. The shorting device 111 and the MR sensor 44 therefore can electrically be in parallel. FIG. 7 shows an isometric illustration of the shorting device 111 consisting of the conductive line 112 per se with its leads 110. In one of our tests with a tin solder, the conductive line 112 of length 50 μm, width 20 μm and thickness 2500 Å yielded a resistance on the order of a few ohms.

Figure 8:
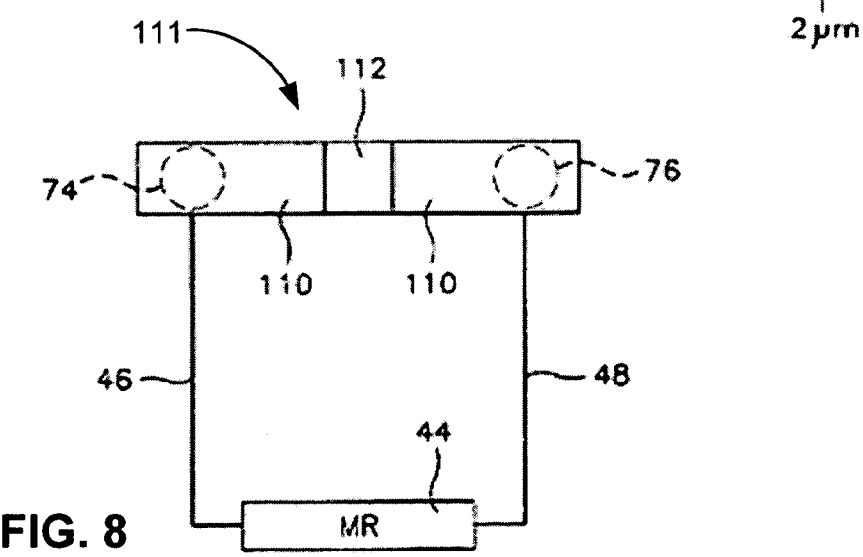
FIG. 8 is a schematic electrical illustration showing the thin film conductive line interconnecting the pair of pads to the MR sensor.

FIG. 8 is an electrical diagram of the shorting device 111 interconnecting the MR pads 74 and 76 in parallel so that the MR sensor 44 is provided with a closed circuit for protection from ESD.

Figure 9A:
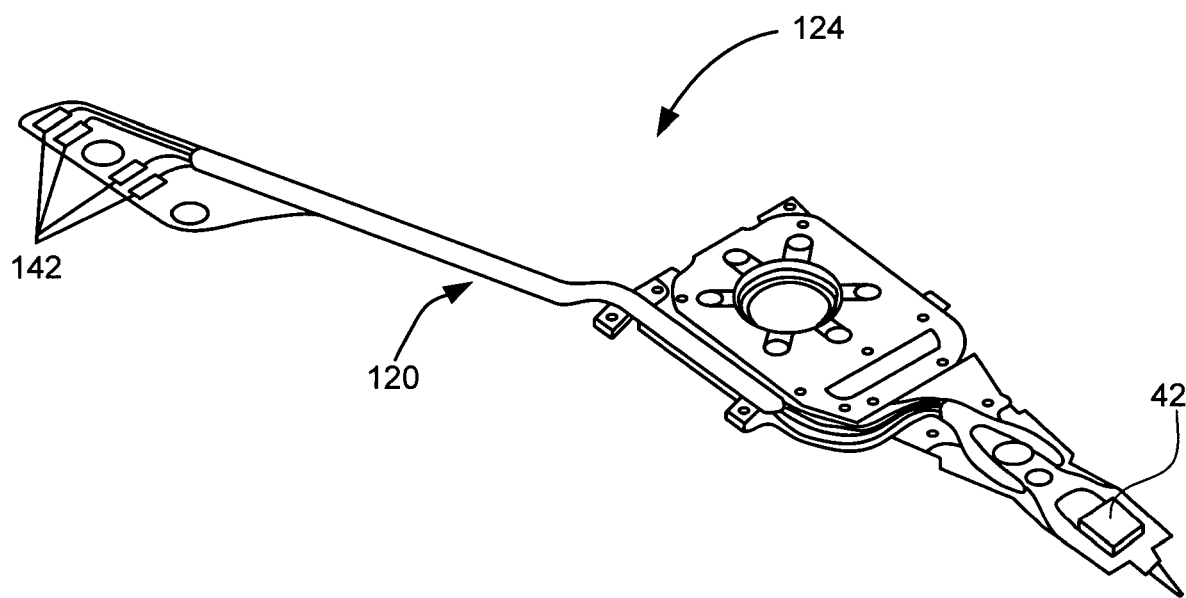
FIGS. 9A and 9B are isometric views of an HGA used in a magnetic disk drive.
Figure 9B:
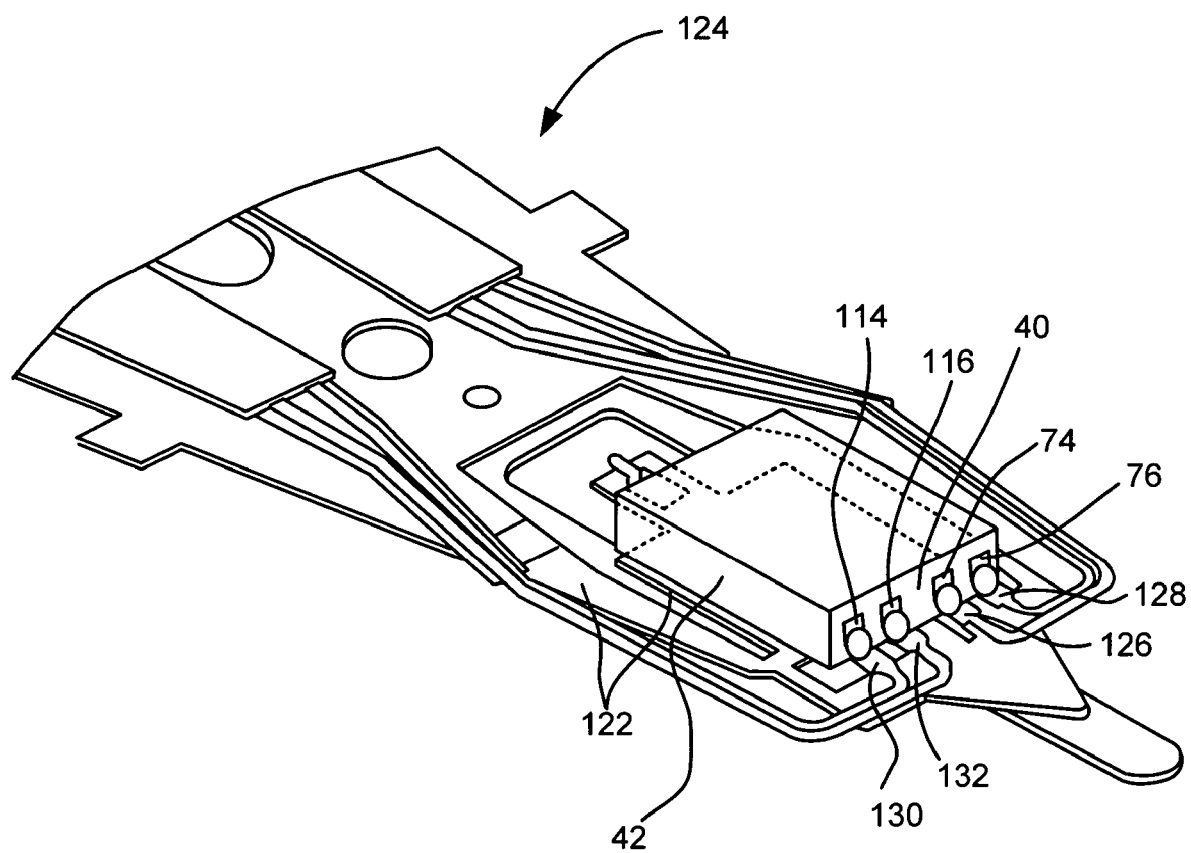

FIG. 9A shows a schematic illustration of a head-gimbal assembly 124. The slider 42 carrying the magnetic head 40 is mechanically attached to the flexure 122 (shown in FIG. 9B) of the suspension assembly 120 by adhesive bonding. Electrical connection between the head transducers and read-write electronics is made by connecting the MR sensor pads 74, 76 to the corresponding suspension leads 126, 128; and write sensor pads 114, 116 to the corresponding suspension leads 130, 132, by solder ball bonding, gold ball bonding or any other suitable method (FIG. 9B). The MR sensor is prone to ESD exposure during the above mentioned assembly process, called HGA process, if it is not protected by a short. On the other hand, the HGA needs to be tested subsequent to the assembly process to confirm its magnetic performance.

As a result, the short needs to be present during the HGA assembly process, needs to be removed for HGA level testing and then placed back again to provide protection during the next level of assembly, head-stack assembly.

Figure 10:
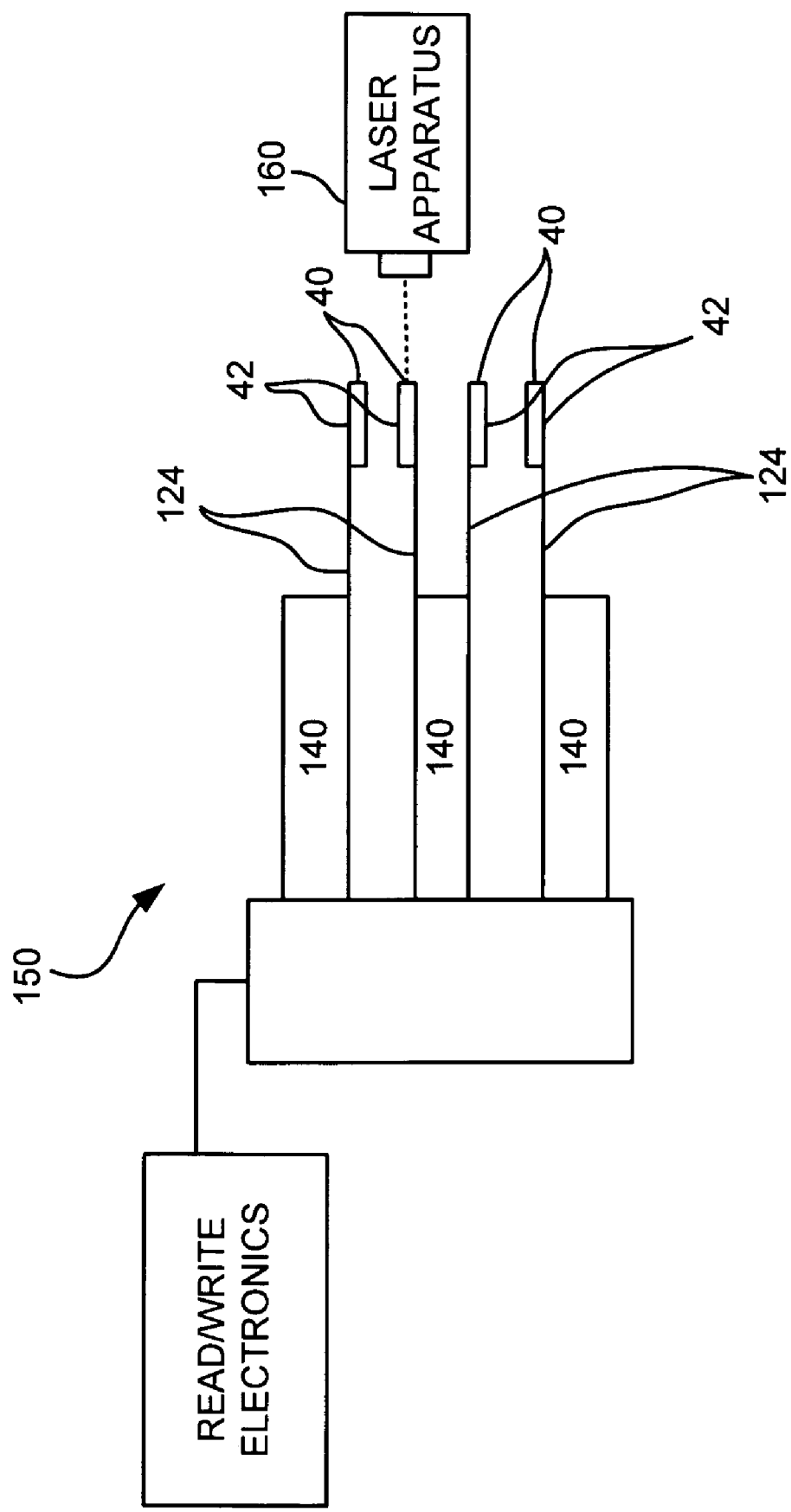
FIG. 10 is a vertical illustration of an actuator assembly with a plurality of HGAs carrying a plurality of merged MR heads and sliders.

FIG. 10 is a schematic diagram of a head-stack assembly 150, which is the next higher level of assembly from HGA. A plurality of HGAs 124 are attached to the actuator arms 140. The tail pads 142 on the HGA 124 (FIG. 9A) are connected to the corresponding pads on a flexible printed circuit assembly (not shown) carrying the Read-Write electronics, to establish communication between the head transducers and the Read-Write electronics. The MR sensor is prone to ESD exposure during the above mentioned assembly process, called HSA process, if it is not protected by a short. On the other hand, the HSA, similar to the HGA, needs to be tested subsequent to the assembly process to confirm its magnetic performance. So, the short needs to be present during the HSA assembly process, and needs to be removed for HSA level testing.

To test the MR sensor, the short needs to be severed. As mentioned above, prior processes sever the short, and the head remains unprotected until it is placed in the final device. In contrast, the present invention allows severing of the short and reformation of the short by laser deposition, as will now be described.

The conductive lines on the magnetic heads at row level and at the head stack assembly (HSA) are severed by a laser apparatus 160. The present invention shown in FIG. 10 traverses a series of laser pulses, or sweeps a continuous wave laser beam, across the width of the conductive line of each magnetic head which results in a severing of the line and rendering the magnetic head operational for use in a magnetic disk drive. One skilled in the art will understand how to aim and fire a sweeping laser across a surface such as the conductive line discussed herein.

As shown in FIGS. 11A–14 the method of severing the short employs a laser beam 162 which has a fluence sufficient to sever the conductive line but insufficient to damage or cause debris from head material underlying and surrounding the conductive line. The head material is typically constructed from alumina ($Al_2O_3$). More specifically, the laser beam 162 provides short duration laser pulses of a high repetition rate which is traversed across the width of the conductive line 112 of each shorting device 111 so that each laser pulse melts conductive material across the line, the melted material withdrawing from the melted area and being heaped on top of opposite adjacent length portions of the conductive line at 164 (FIG. 12A) by surface tension and the melted material cooling to room temperature before the next pulse so that there is no cumulative heating and therefore no damage to or debris from structure underlying or surrounding the conductive line. With this method the conductive material is incrementally plowed to each side of a cleared path by successive overlapping laser pulses so that when the train of laser pulses has traversed the width of the conductive line 112 the shorting device 111 has been severed.

Since the leads for the sensor in general reside on a plane of alumina in the case of an MR head, the method takes advantage of the fact that most molten metals dewet on a dielectric such as alumina. For instance, tin-containing conductive lines on alumina and connecting gold leads tend to be attracted to the gold leads and stays on the gold surface. Conceptually, the gold acts as a reservoir for the shorting material. Upon application of the laser beam, the exposed portions of the conductive line melts and dewets. Dewetting of the molten film causes the molten metal to separate and attempt to move itself away from the alumina surface towards each of the two pads until resolidification, and leads to the unshorting effect. It is not necessary to ablate the material, but merely melt it with the laser. Note that ablation should not be precluded as an option.

Figure 11A:
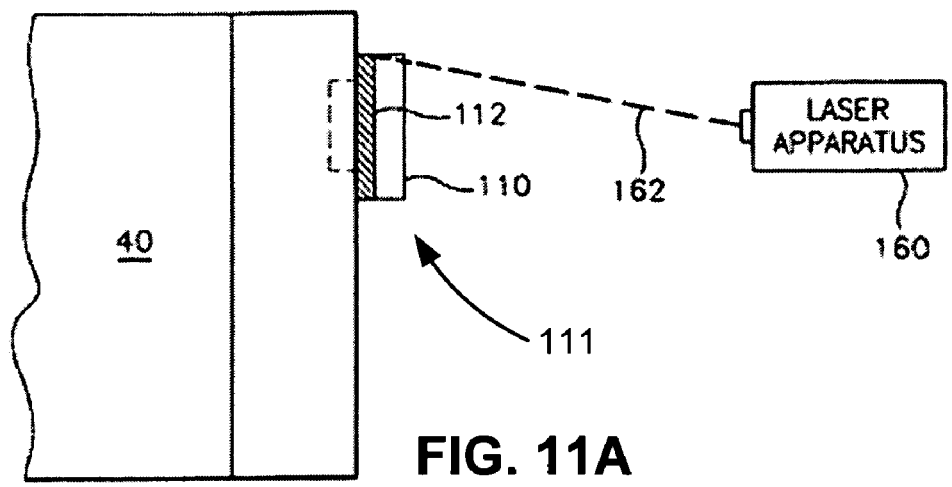
FIGS. 11A and 11B are vertical and plan views at the commencement of severing of the thin film conductive line at a shorting pad by a laser apparatus.
Figure 11B:
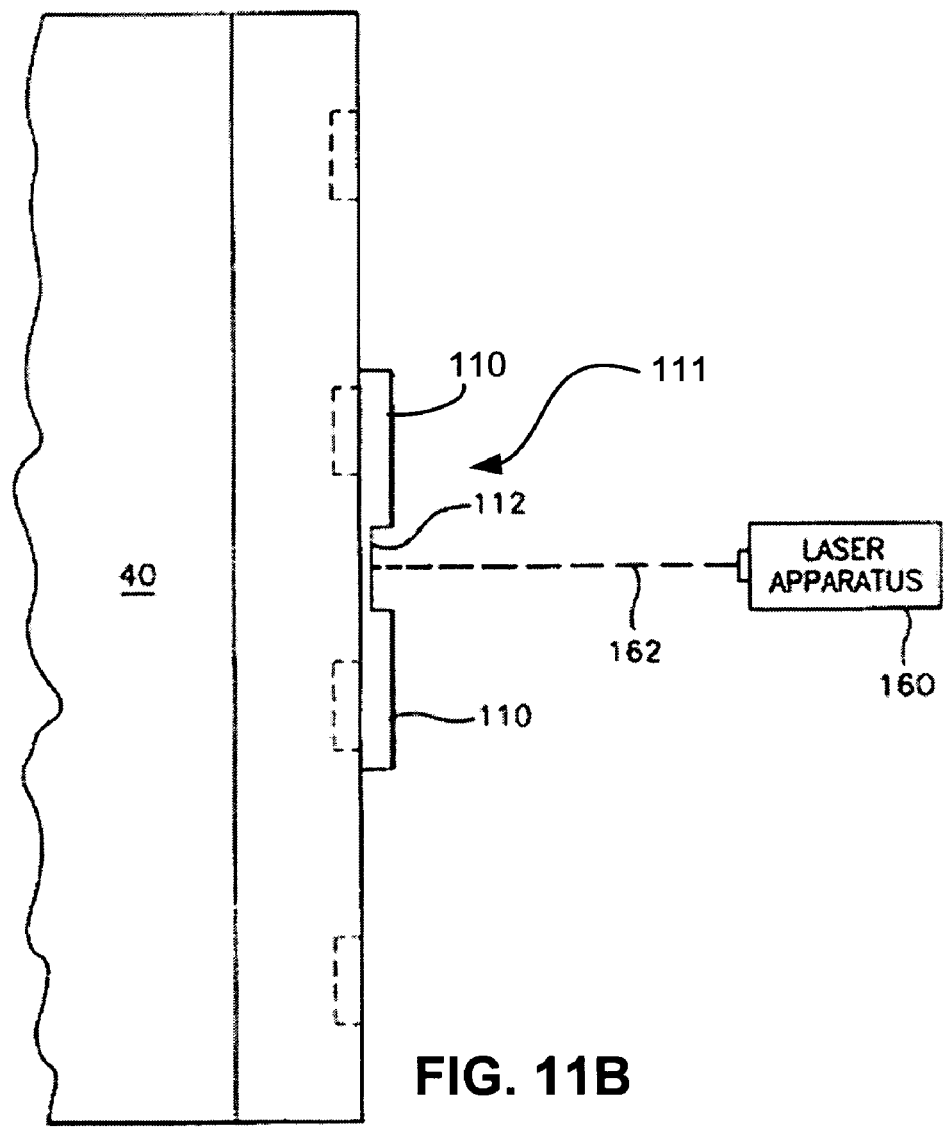
Figure 12A:
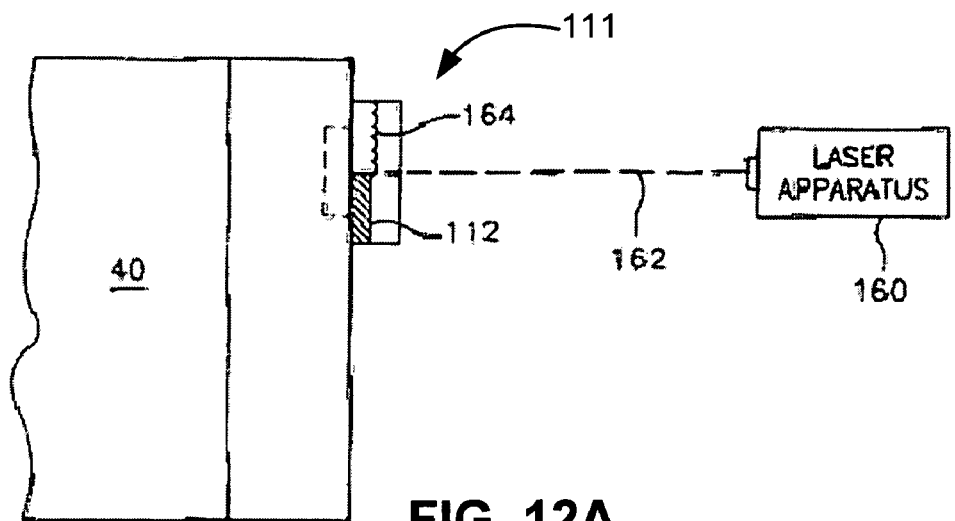
FIGS. 12A and 12B are the same as FIGS. 11A and 11B except the laser apparatus is half-way through the severing process.
Figure 12B:
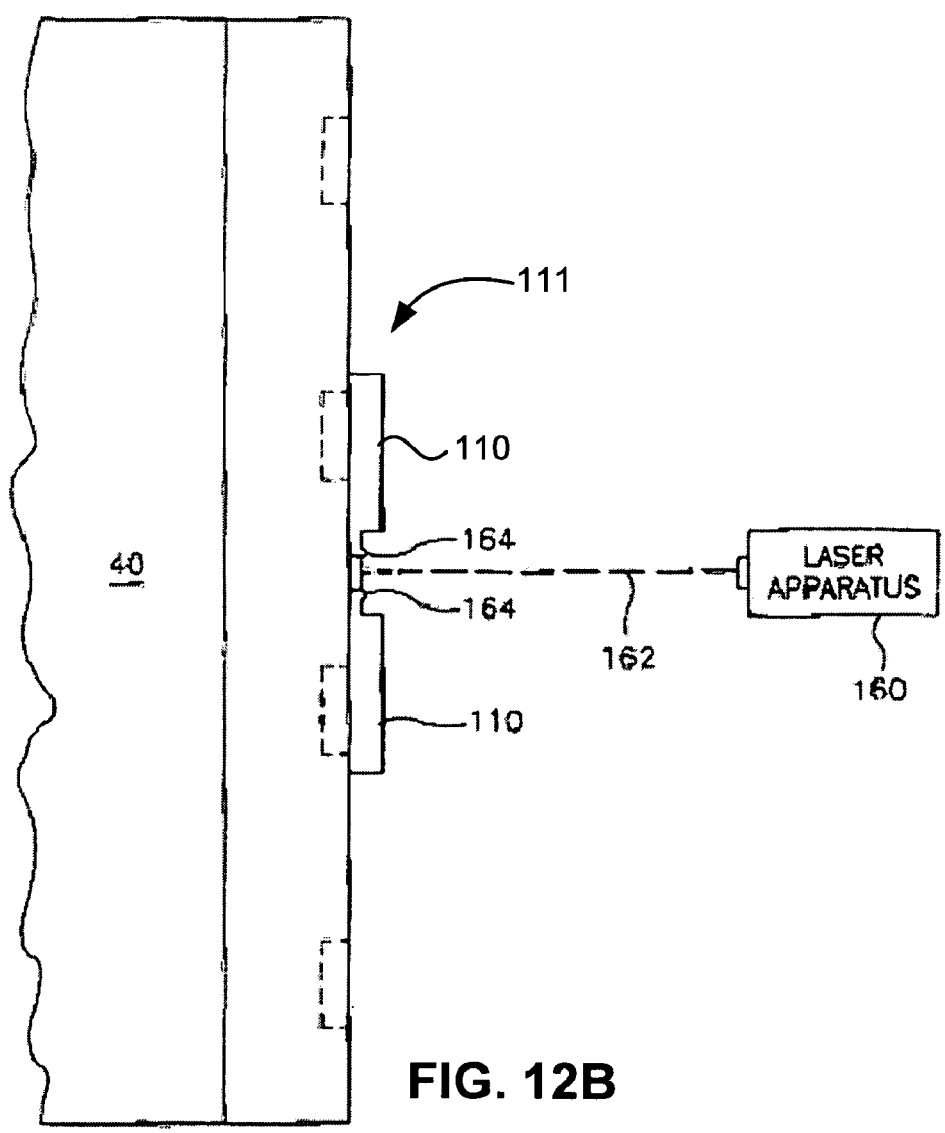
Figure 13A:
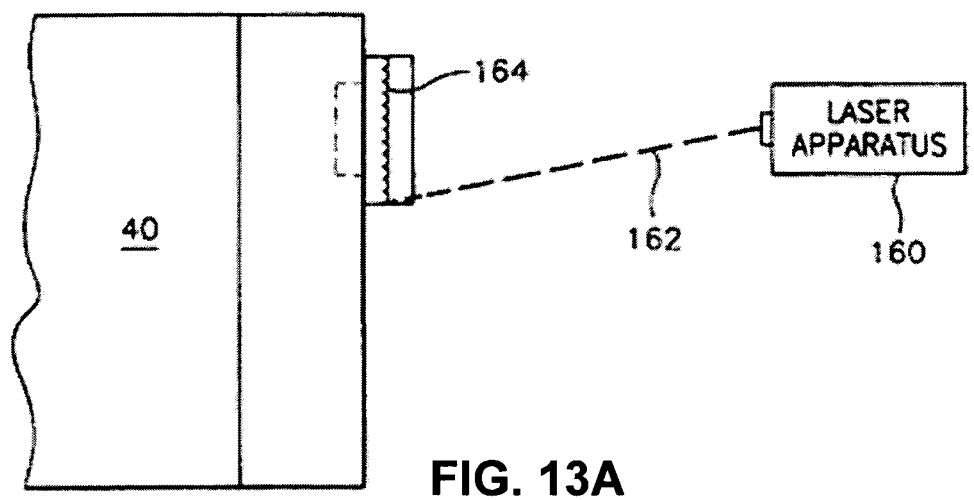
FIGS. 13A and 13B are the same as FIGS. 12A and 12B except the conductive line has been completely severed across its shorting pad by the laser apparatus.
Figure 13B:
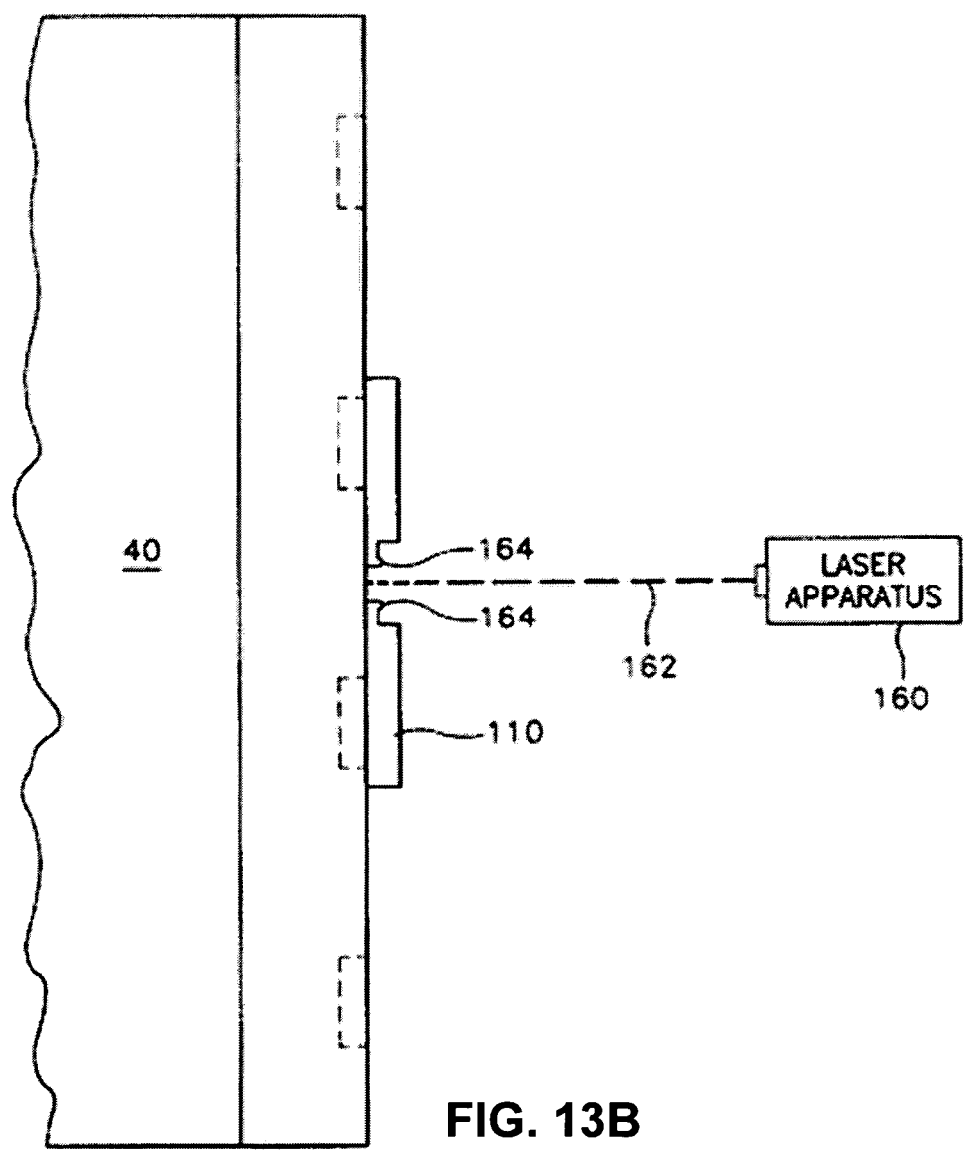
Figure 14:
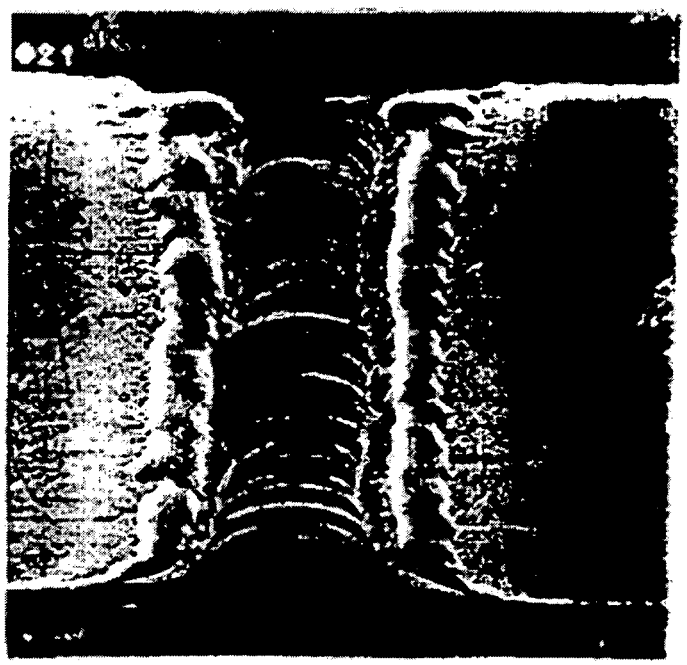
FIG. 14 is a SEM photograph showing the severing of a conductive line at its shorting pad by the laser apparatus in the case of NiFe being the material for the conductive line.

FIGS. 11A and 11B show the laser beam 162 at commencement of the severing process, FIGS. 12A and 12B show the laser beam intermediate of the severing process and FIGS. 13A and 13B show a completion of the severing process by the laser beam 162. A SEM photograph showing the severing of a NiFe conductive line on alumina is shown in FIG. 14. The severing extends across a width of the line and the material plowed from the path of separation is shown at 164 on each side of the cut due to surface tension.

Figure 15:
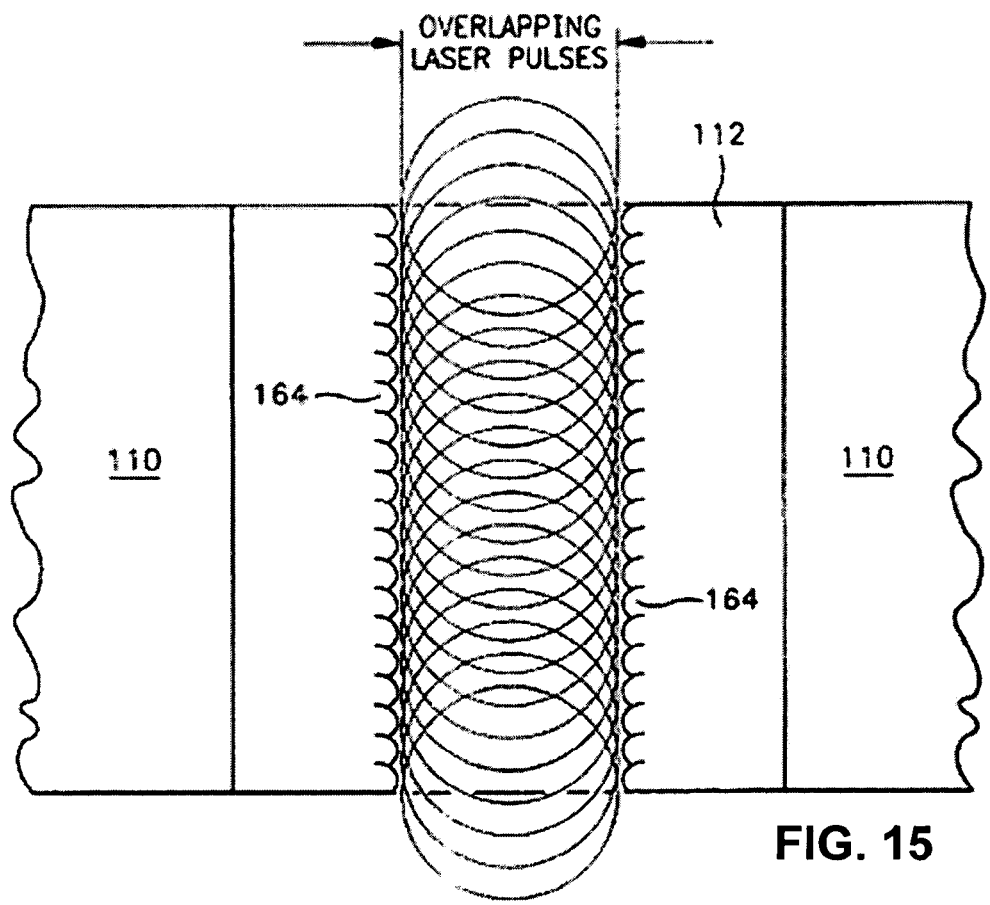
FIG. 15 is a schematic plan illustration of a series of overlapping laser pulses having cut through a shorting pad.

FIG. 15 shows a schematic drawing of overlapping laser pulses which can overlap 95% or less provided the parameters of the invention are practiced. For the case of a conductive line made of NiFe, a pulsed laser may be employed in the laser apparatus. The practical parameters for severing NiFe are presented in U.S. Pat. No. 5,759,428, which is incorporated by reference.

Another method for severing the short is by heating one or both of the gold-capped leads. By choosing appropriately a metal for the conductive line that has lower melting point than the leads, i.e., the base metal (gold in this case), heat is transferred to and melts the shorting metal film. Since solder has good wetting properties on gold, the molten solder dewets, on alumina and flows toward the gold pad. Upon resolidification, part or most of it remains on the gold pad. In this respect, the gold pad acts as a reservoir of the resolidified shorting metal. A second shorting process can be conducted to short the leads again. To activate the sensor by unshorting, repeat the unshorting process, e.g., scanning laser severing or laser heating of the leads. The shorting and unshorting operations can be repeated.

Because the short is now severed and the MR circuit open, testing can be performed. After testing, the need to protect the MR sensor from ESD damage arises again. Thus, the short should be recreated.

The short is recreated by reforming the conductive lines by applying more electrically conductive shorting material using a laser deposition process. In a preferred embodiment, the shorting material is deposited using a laser process commonly known as Laser Induced Forward Transfer (LIFT), which will be described in detail below. The shorting material added to recreate the short can be the same as the shorting material originally used to form the conductive lines, or can be another material compatible with the original shorting material, pad, and/or lead depending on its positioning. The LIFT deposited shorting material can be added to a different region than where the first shorting material was added. Also note that the LIFT process can be performed on the entire wafer, rows, as well as single sliders/heads and heads mounted on HGA and HSA.

There are other laser techniques for deposition of films, such as e.g., Pulsed Laser Deposition (PLD) and Laser Chemical Vapor Deposition (LCVD). Both PLD and LCVD are able to produce patterned films with fine features, but must be conducted with some photoresist processes. Also, both require careful control of the ambient pressure or special gaseous environments which can increase manufacturing cost.

Figure 16:
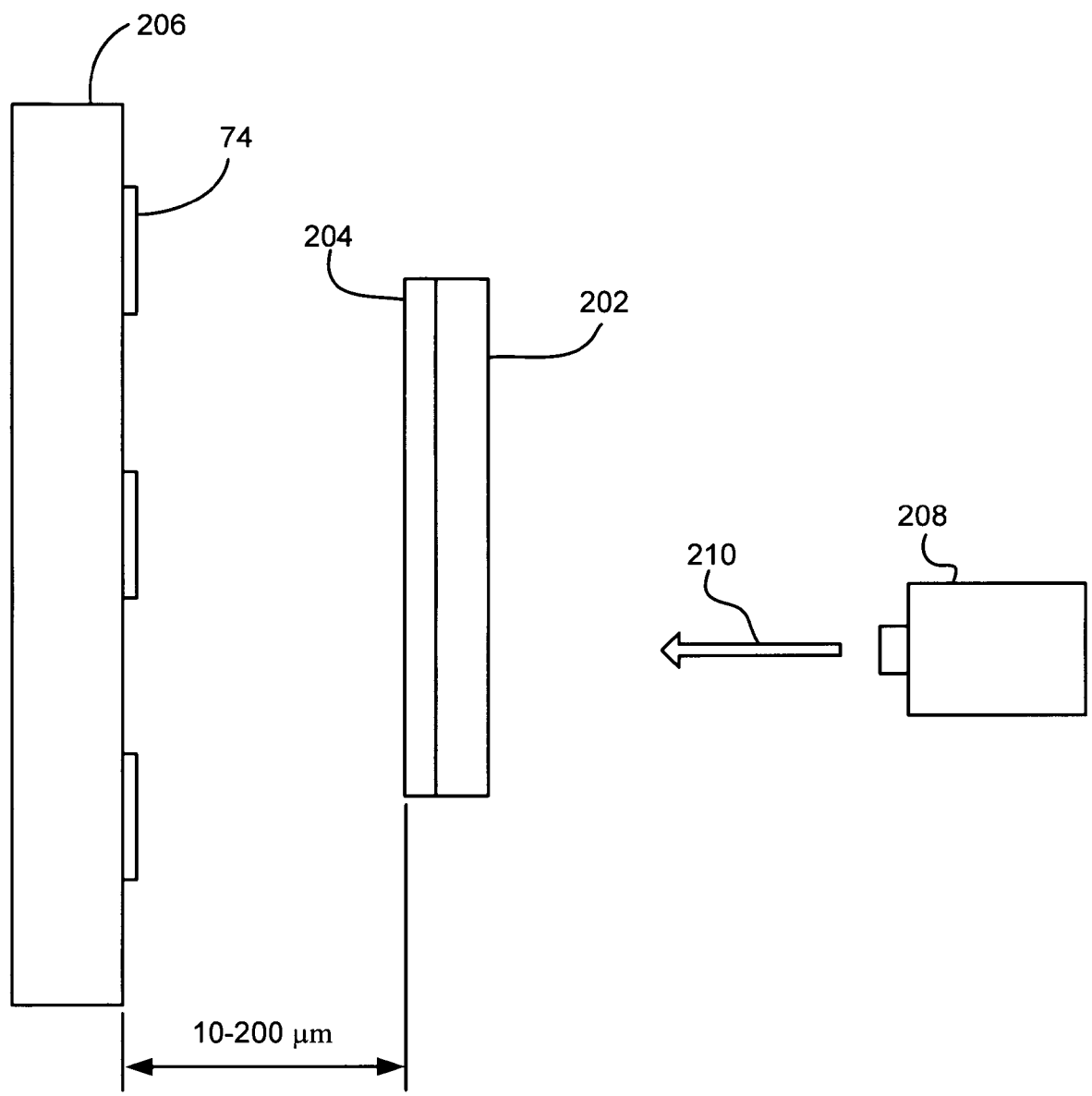
FIG. 16 is a representative drawing of the essential features of a Laser-Induced Forward Transfer (LIFT) process.

FIG. 16 is a representative drawing of the essential features of a LIFT process. As shown, the LIFT process includes an emitting substrate 202 on which a thin film 204 of shorting material has been previously deposited for the transfer. In this example the film 204 is a metal film, such as Tin solder. The substrate 202 is a medium transparent to the laser which effects LIFT, and can be rigid (e.g., as glass) or deformable (e.g., flexible as in a tape). Adjacent to the emitting substrate 202 and spaced about 10 to 200 microns away is the collecting surface 206, e.g., the deposited end of a magnetic sensor on which a short is to be created. A laser 208 is used to transfer material from the metal film 204 to the collecting surface 206 via laser pulses 210 that ablate the shorting material. The ablated material jumps the gap onto the collecting surface 206. If properly aligned, the ablated material will form between the leads, recreating the short.

Figure 17:
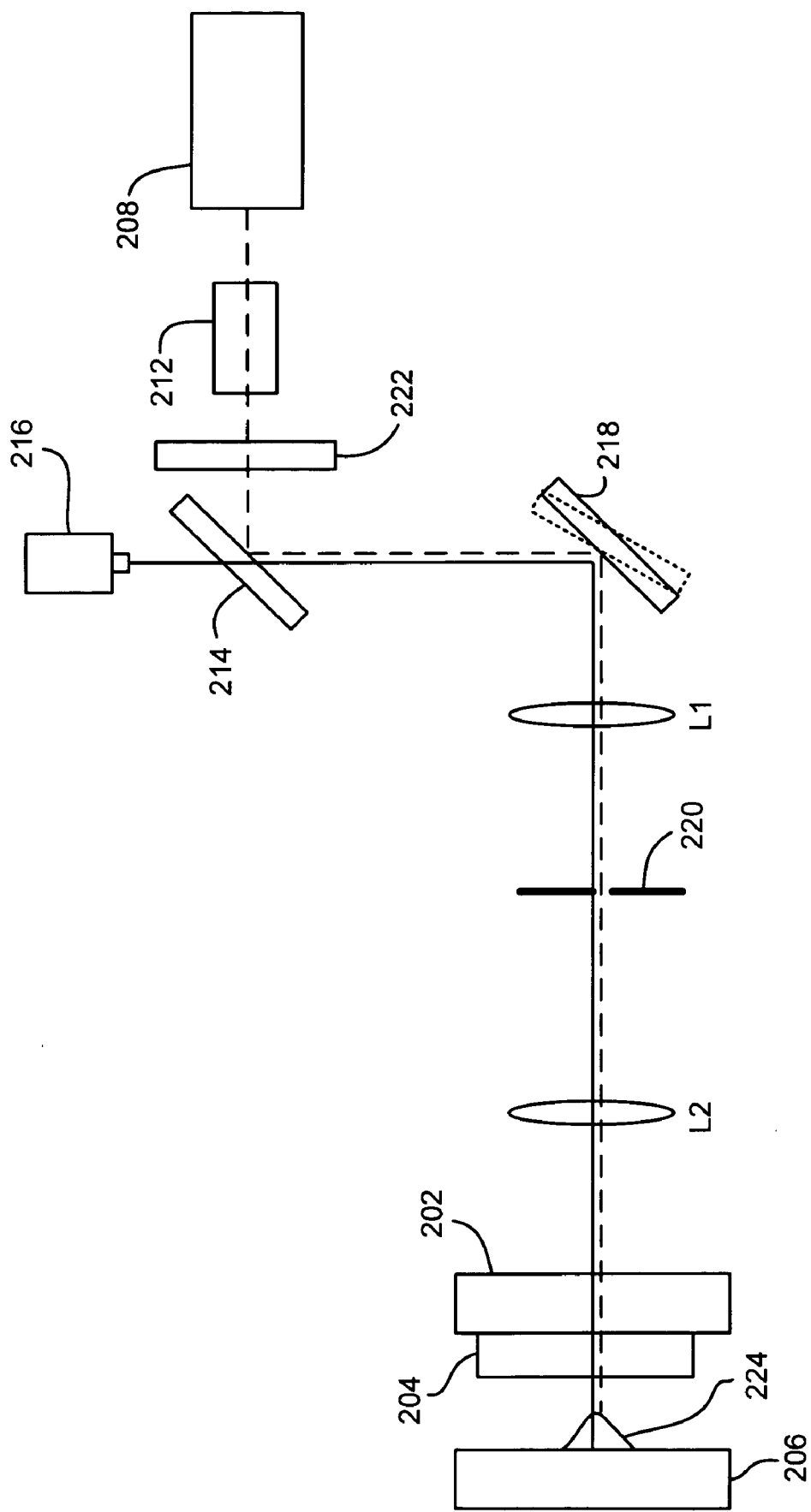
FIG. 17 is a system diagram of an illustrative optical arrangement for a LIFT process.

A schematic of an illustrative optical arrangement for a LIFT process is shown in FIG. 17. A compact diode-pumped, Q-switched, Nd:YLF, 1047 nm wavelength pulsed laser 208 with pulse width of about 10 nanoseconds and pulse energy about 2 µJ at 1 kHz repetition rate. The beam expander 212 expands the laser beam (shown as a broken line) by 1.5–5×. A dielectric-coated mirror 214 (high reflectivity at 1047 nm and high transmissivity in the red) is then used to "merge" the IR laser beam with a beam (shown as solid line) from an "indicator" laser 216 at 670 nm, which is used for alignment and visualization. Note that the lines representing the IR laser beam (broken line) and indicator laser beam (solid line) are deliberately staggered, although they actually have collinear paths. The collinear IR/red beams are directed towards a galvo scanning mirror 218 to produce the required patterns on the sample, making use of a telecentric scanning lens L1. The plane of the scanning mirror is located one focal length from L1. Downstream of L1 and one focal length away is a slit 220 or a transmission aperture to define the irradiated area. The beam passing through the slit is ultimately focused onto the transferring film 204 with lens L2. A 1-to-1 projection for imaging is used. The focal lengths of L1 and L2 used here are 100 and 75 mm, respectively, though can vary from these values. To avoid any undesirable back-reflection onto the diode-pumped IR laser, which can cause instability in the laser, a quarter-wave (QW) plate 222 is placed after the beam expander 212 or another suitable location. The collecting surface 206 is located near and facing the emitting film 204 with a separation adjustable by a micrometer. A gas can also be provided through the region between the emitting and collecting substrates, i.e., the transfer gap, such that LIFT can be performed in air, helium or other gases, typically at 1 atmosphere pressure. One skilled in the art will understand that the components of the LIFT apparatus and the processing parameters can vary depending on the desired results, materials used, processing conditions, etc.

The laser 208 sends appropriately conditioned pulses through the emitting substrate 202 onto the metal film 204. The metal film 204 is heated and ablated by each laser pulse. Each ablation launches the molten metal and vapor mixture across the space and deposits it on the collecting surface 206. The deposited material is indicated by reference number 224.

In order to control the thickness of the deposited spot of shorting material with repeated LIFT, the emitting substrate 206 can be translated. FIG. 18 illustrates how the thickness of the transferred shorting material 224 on the receiving surface 206 can be built up during a LIFT process by alternating translation of the emitting substrate 202 and multiple laser pulses. After each translation of the emitting substrate 206, the laser irradiates on a fresh part of the emitting film 204. If a line of material is to be deposited, the laser can be suitably masked with the slit 220 and scanned using the galvo scanner 218 across the emitting film. Repeated scans will build up the thickness of the shorting line 224 across the leads 110, which in turn reduces the electrical conductivity of the "short". In other words, layers of shorting material are added until the thickness of the deposited material provides the desired electrical resistance (or conductivity). At the end of the LIFT process, the shorting line forms the conducting line 112 which can be laser severed later. The desired resistance is preferably lower than the MR sensor so that most of the current during an ESD event goes through the short rather than the MR sensor. About 1000–10000 Å of deposited material can provide sufficiently low resistance for typical MR sensors. Additionally or alternatively, the electrical resistance of the short can be probed by measuring conductivity across the pads (and accounting for conduction through the MR sensor) and monitoring the resistance, stopping the process when the desired resistance is achieved. Also, in embodiments where many heads are present in a row, the just-completed head can be probed and the LIFT process tuned for the next head. The system can also go back and deposit more material on the first head to decrease resistance.

Figure 19A:
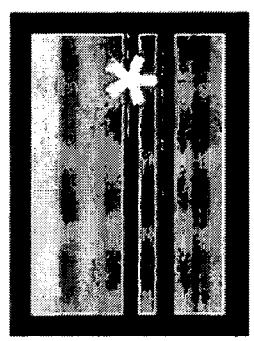
FIG. 19A illustrates the barcode for the symbol "*".
Figure 19B:
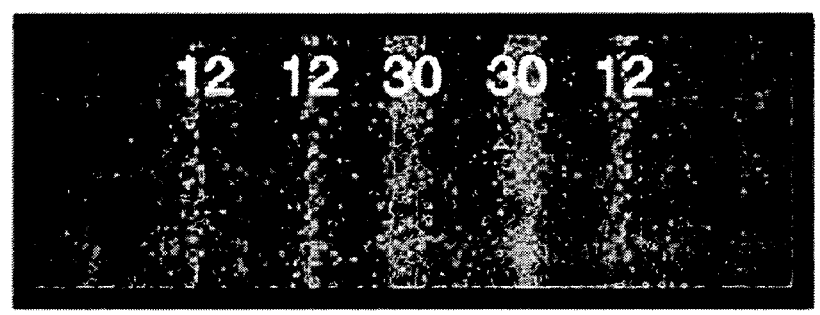
FIG. 19B depicts lines of material formed by a LIFT process to create the barcode for the symbol "*".
Figure 19C:
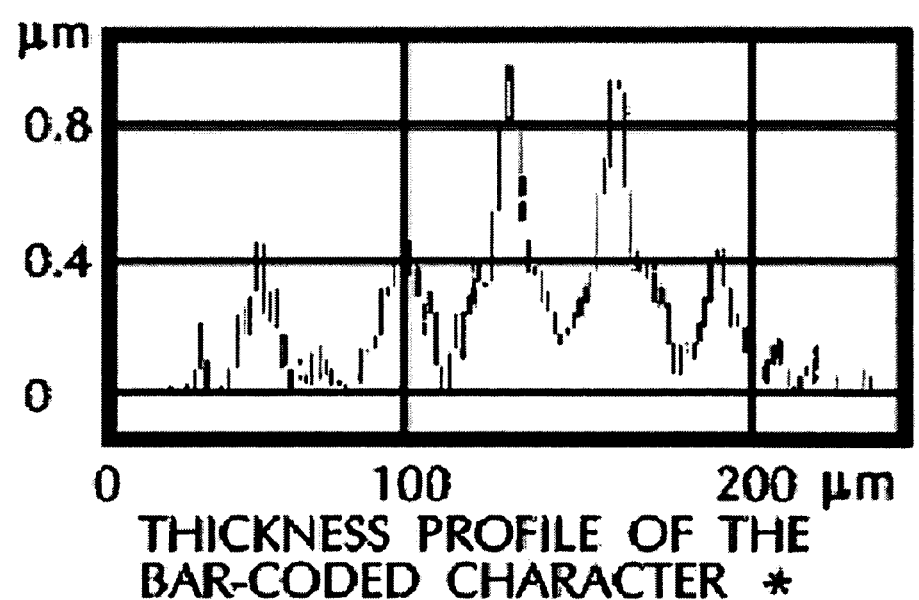
FIG. 19C is a graph showing the sequence of nominal thickness of transferred material as a function of the number of transfers to form the bar code for the symbol "*".

The effect of LIFT is illustrated by a study of transferring chromium on glass using the apparatuses shown in FIGS. 17 and 18. FIG. 19B depicts lines of various width all formed by a LIFT process. If the contrast of the five lines is interpreted as the width of bars in the barcode as shown in FIG. 19A, these five lines represent the symbol "*". The sequence for the number of scans or transfers as shown in FIG. 19B is "12, 12, 30, 30, 12". FIG. 19C shows the sequence of nominal thickness of transferred material as a function of the number of transfers to form the bar code. The thicknesses are "0.4 µm, 0.4 µm, 0.9 µm, 0.9 µm, 0.4 µm. FIGS. 19A–C indicate that the process is repeatable, as three of the runs had 12 transfers, and two had 30 transfers. At 30 transfers, the line thickness were consistently about 0.9 micron. At 12 transfers, the line thickness were consistently about 0.4 micron.

In an implementation, there are two preferred locations on the deposited end for the deposition of the LIFT metal film for ESD protection of the read sensor. The first is the space between the two adjoining gold read pads. Here the surface is alumina and the spacing of the gold pad is typically 20 to 60 microns. This location is accessible up to the slider level. At the HGA/HSA level, solderball-covered gold pads can mask optical access. Also, the solder can protrude as much as 100 microns from the gold surface. This limits the spacing between the emitting substrate and the collecting surface to a minimum of 100 microns, which may not be optimum for a particular LIFT process. To facilitate LIFT at the HGA/HSA level, the two sensor leads can be brought to a different location on the deposited end that offers optical access and such that each terminates at a gold pad of the appropriate size and spacing from each other.

Figure 20:
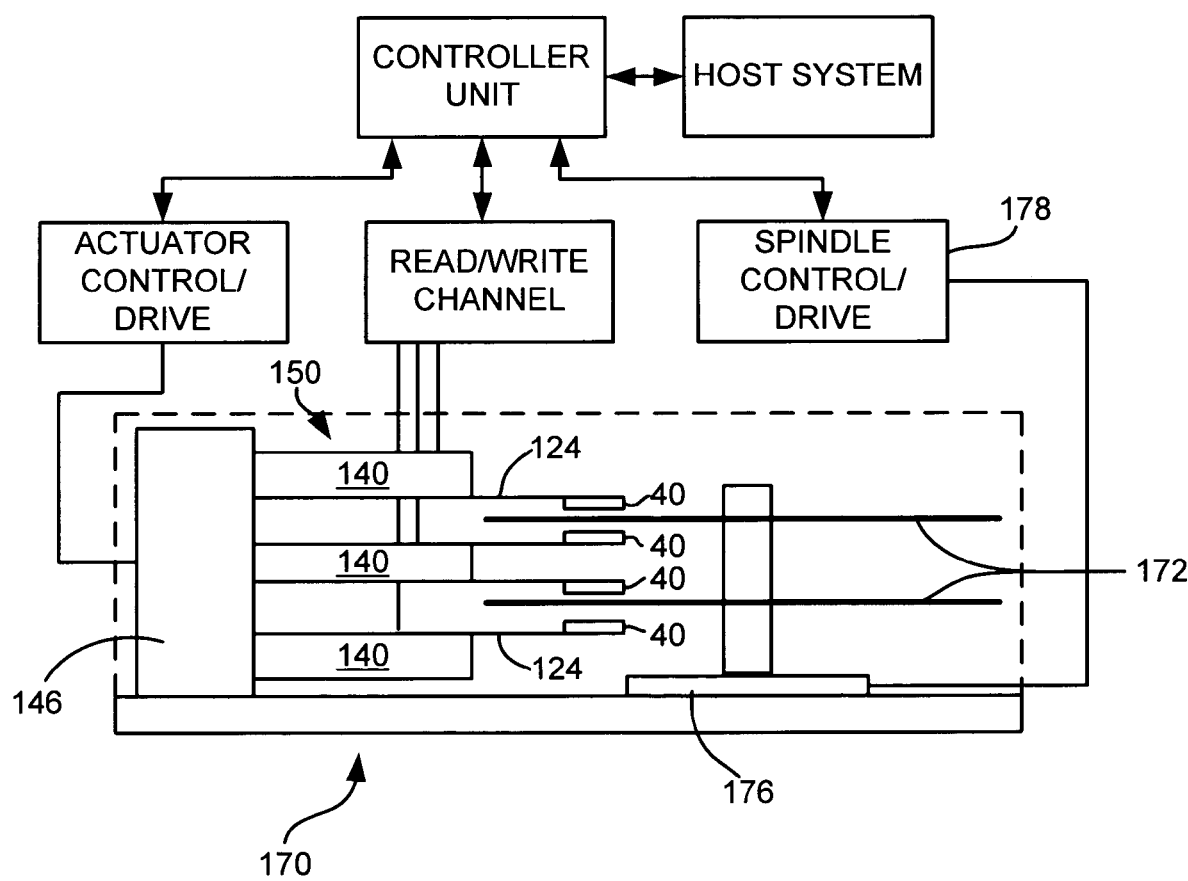
FIG. 20 is a schematic elevational view of a magnetic disk drive employing magnetic heads processed by the present invention.

The best time to sever the conductive lines on the magnetic heads for the final time is after completion of the head stack assembly 150 as shown in FIG. 10. After cutting the conductive lines on the magnetic heads for the final time, the head stack assembly 150 is merged with a disk stack assembly to form the magnetic data storage system 170 as shown in FIG. 20. The magnetic data storage system 170 includes a plurality of double-sided magnetic disks 172 which are mounted on a spindle 174. The spindle 174 and the disks 172 are rotated by a spindle motor 176 which is controlled by motor control 178. The head stack assembly 150 is mounted on a actuator shaft 146 which is attached to the chassis and is rotated by a rotary voice coil motor (not shown). The rotary voice coil motor rotates actuator arms 140 about the actuator shaft 146 in order to move the head gimbal assemblies 124 to the desired radial position on disks 124. Upon rotation of the magnetic disks 172 the sliders are supported a slight distance from the surfaces of the disks, on the order of 15 nm, by air cushions which are generated by the rotating disks.

There has thus been disclosed a process that provides repeatable ESD protection. Several advantages of the LIFT-shorting and laser unshorting method for ESD protection follow.

(1) LIFT shorting and laser unshorting can be applied at one or more slider fabrication levels, i.e., wafer, row, slider, HGA or HSA.

(2) It is possible to design a single tool that can perform both LIFT and laser unshorting.

(3) The volume of metal transferred by LIFT for shorting is typically less than a few percent of the volume of a 100 microns diameter solderball used in HGA assembly of a femto slider lead. As a result, multiple LIFT shorting/unshorting operations can be performed on the same sensor. This provides an opportunity to unshort before sensor testing and to ESD protect by shorting.

(4) The melting point of solder used in the HGA solderball bonding process is around 250° C. and gold 1064° C. There is little chance for the unshorting laser to melt the gold pad if properly used as a thermal platform for dewetting the solder short.

(5) The same kind of solder can be used for shorting and solderball bonding. Therefore the metal is benign.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for shorting, unshorting, and reshorting an electronic component, comprising:
   forming a conductive line of an electrically conductive first shorting material for creating a short between electrical pads or leads operatively coupled to an electronic component;
   severing the short by melting the first shorting material using a laser; and
   recreating the short by applying a second shorting material.

2. A method as recited in claim 1, wherein the conductive line is formed between pads or leads operatively coupled to the electronic component.

3. A method as recited in claim 1, wherein the conductive line is formed between secondary pads or leads operatively coupled to the electronic component.

4. A method as recited in claim 1, wherein the first shorting material is the same as the second shorting material.

5. A method as recited in claim 1, wherein the first shorting material is different than the second shorting material.

6. A method as recited in claim 1, wherein at least one of the first and second shorting materials is a metal.

7. A method as recited in claim 1, wherein the first or second shorting material is a metallic solder.

8. A method as recited in claim 1, wherein the first or second shorting material is a tin-containing material.

9. A method as recited in claim 1, wherein the first or second shorting material is a material that would otherwise be present on the electronic component in an as-sold condition.

10. A method as recited in claim 1, wherein the first or second shorting material is a material that would not otherwise be present on the electronic component in an as-sold condition.

11. A method as recited in claim 1, wherein the first or second shorting material has a melting point lower than the pads or leads to which coupled.

12. A method as recited in claim 1, wherein the first or second shorting material has a melting point higher than the pads or leads to which coupled.

13. A method as recited in claim 1, wherein the first or second shorting material dewets upon melting.

14. A method as recited in claim 1, wherein the first or second shorting material dewets upon severing of the short by the laser.

15. A method as recited in claim 1, wherein the short severed by the first or second shorting material being severed between the pads or leads.

16. A method as recited in claim 1, wherein the short severed by the first or second shorting material being severed over a nonfunctional pad or lead.

17. A method as recited in claim 1, wherein the second shorting material is created using a laser deposition process.

18. A method as recited in claim 17, wherein the laser deposition process includes pulsed laser deposition.

19. A method as recited in claim 17, wherein the laser deposition process includes laser chemical vapor deposition.

20. A method as recited in claim 17, wherein the laser deposition process includes laser-induced forward transfer (LIFT).

21. A method as recited in claim 20, wherein multiple layers of the second shorting material are applied using LIFT.

22. A method as recited in claim 20, wherein an emitting substrate supporting a material transferred by LIFT is rigid.

23. A method as recited in claim 20, wherein an emitting substrate supporting a material transferred by LIFT is deformable.

24. A method as recited in claim 1, wherein the short created by the second shorting material has an electrical resistance lower than the electronic component.

25. A method as recited in claim 1, wherein the second shorting material is formed at a location different than the location of the first shorting material.

26. A method as recited in claim 1, further comprising severing the short created by the second shorting material.

27. A method as recited in claim 26, further comprising reapplying the second shorting material for recreating the short a second time.

28. A method as recited in claim 1, wherein the electronic component is at least one of a magnetoresitive (MR) sensor and a tunnel junction sensor.

29. A method for shorting, unshorting, and reshorting a magnetic sensor, comprising:
   forming a conductive line of an electrically conductive first shorting material for creating a short between electrical pads or leads operatively coupled to an electronic component;
   severing the short by melting the first shorting material; and
   recreating the short by applying a second shorting material.

30. A method as recited in claim 29, wherein the second shorting material is created using a laser deposition process.

31. A method as recited in claim 30, wherein the laser deposition process includes laser-induced forward transfer (LIFT).

32. A method as recited in claim 29, further comprising severing the short created by the second shorting material.

33. A method as recited in claim 32, further comprising reapplying the second shorting material for recreating the short a second time.

34. A method as recited in claim 29, wherein the electronic component is at least one of a magnetoresitive (MR) sensor and a tunnel junction sensor.

* * * * *